(12) United States Patent
Ban et al.

(10) Patent No.: US 9,866,345 B2
(45) Date of Patent: Jan. 9, 2018

(54) DEVICE, SYSTEM AND METHOD FOR TRANSMITTING WAVELENGTH DIVISION MULTIPLEXED OPTICAL SIGNAL

(71) Applicant: FUJITSU LIMITED, Kawasaki-shi, Kanagawa (JP)

(72) Inventors: Yuki Ban, Kawasaki (JP); Yuji Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/373,725

(22) Filed: Dec. 9, 2016

(65) Prior Publication Data

US 2017/0222747 A1    Aug. 3, 2017

(30) Foreign Application Priority Data

Jan. 28, 2016  (JP) .................... 2016-014612

(51) Int. Cl.
*H04J 14/02* (2006.01)
*H04Q 11/00* (2006.01)

(52) U.S. Cl.
CPC ........ *H04J 14/021* (2013.01); *H04J 14/0287* (2013.01); *H04Q 11/0005* (2013.01); *H04Q 2011/0016* (2013.01)

(58) Field of Classification Search
CPC ....... H04Q 11/0005; H04Q 2011/0016; H04Q 11/0062; H04Q 11/0001; H04J 14/021; H04J 14/0287; H04J 14/0212; H04J 14/0227
See application file for complete search history.

(56) References Cited

U.S. PATENT DOCUMENTS

| 2003/0223745 A1* | 12/2003 | Tomofuji | H04J 14/0227 398/9 |
| 2006/0051094 A1* | 3/2006 | Moriwaki | H04J 14/0209 398/84 |
| 2012/0275781 A1* | 11/2012 | McDonald | H04J 14/0283 398/25 |

FOREIGN PATENT DOCUMENTS

| JP | 1993-327674 | 12/1993 |
| JP | 2001-119359 | 4/2001 |

* cited by examiner

*Primary Examiner* — Ted Wang
(74) *Attorney, Agent, or Firm* — Fujitsu Patent Center

(57) ABSTRACT

A transmission device for which a work path is established in a first degree and a protection path is established in a second degree includes: a switch equipped with a plurality of optical ports; an optical signal generator, optically connected to a first optical port, and configured to generate an optical signal that is transmitted through the work path; and a monitor light generator, optically connected to a second optical port, and configured to generate monitor light by using a wavelength tunable light source. The monitor light generator controls a wavelength of the monitor light to be substantially the same as a wavelength of the optical signal. The switch guides the optical signal that arrives at the first optical port toward the first degree and guides the monitor light that arrives at the second optical port toward the second degree.

9 Claims, 14 Drawing Sheets

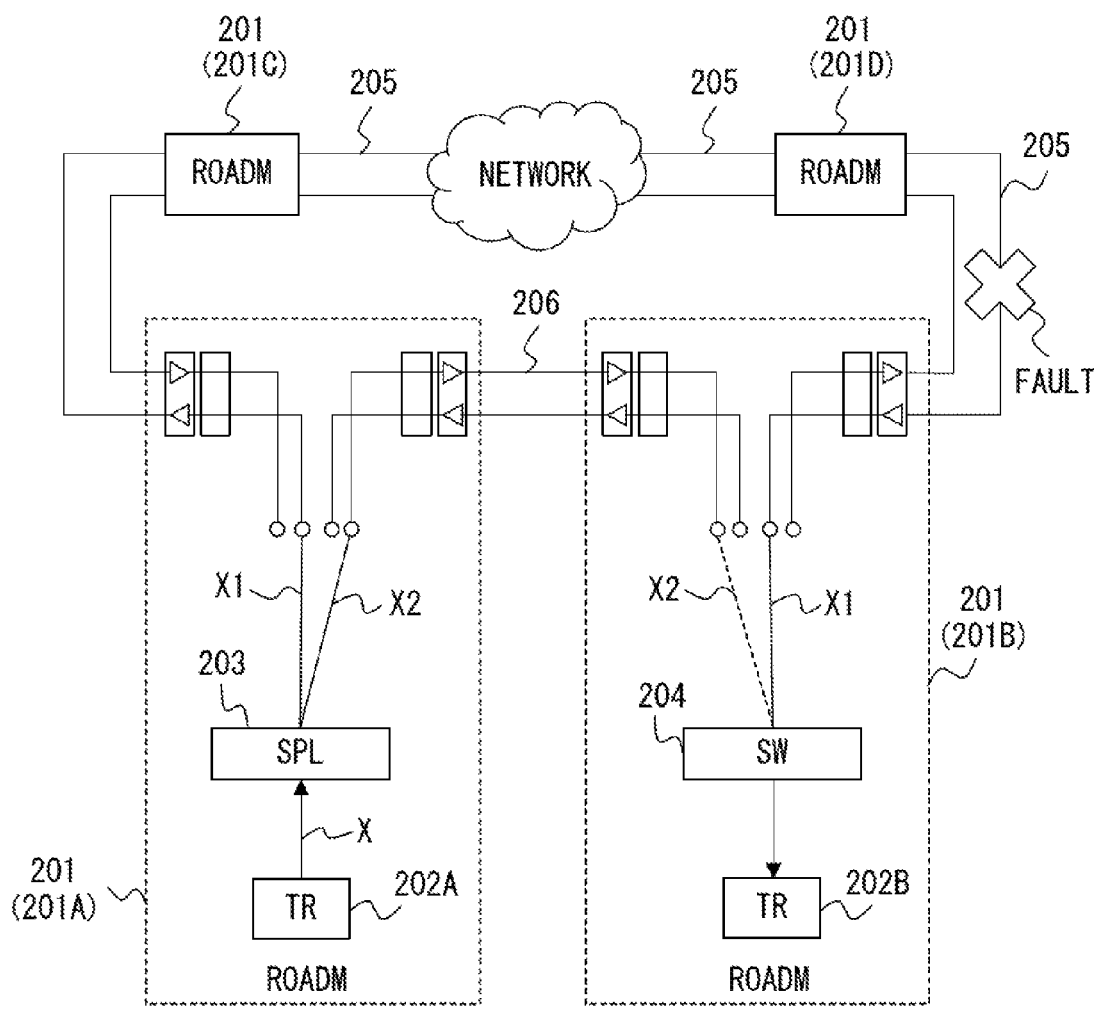
F I G. 1

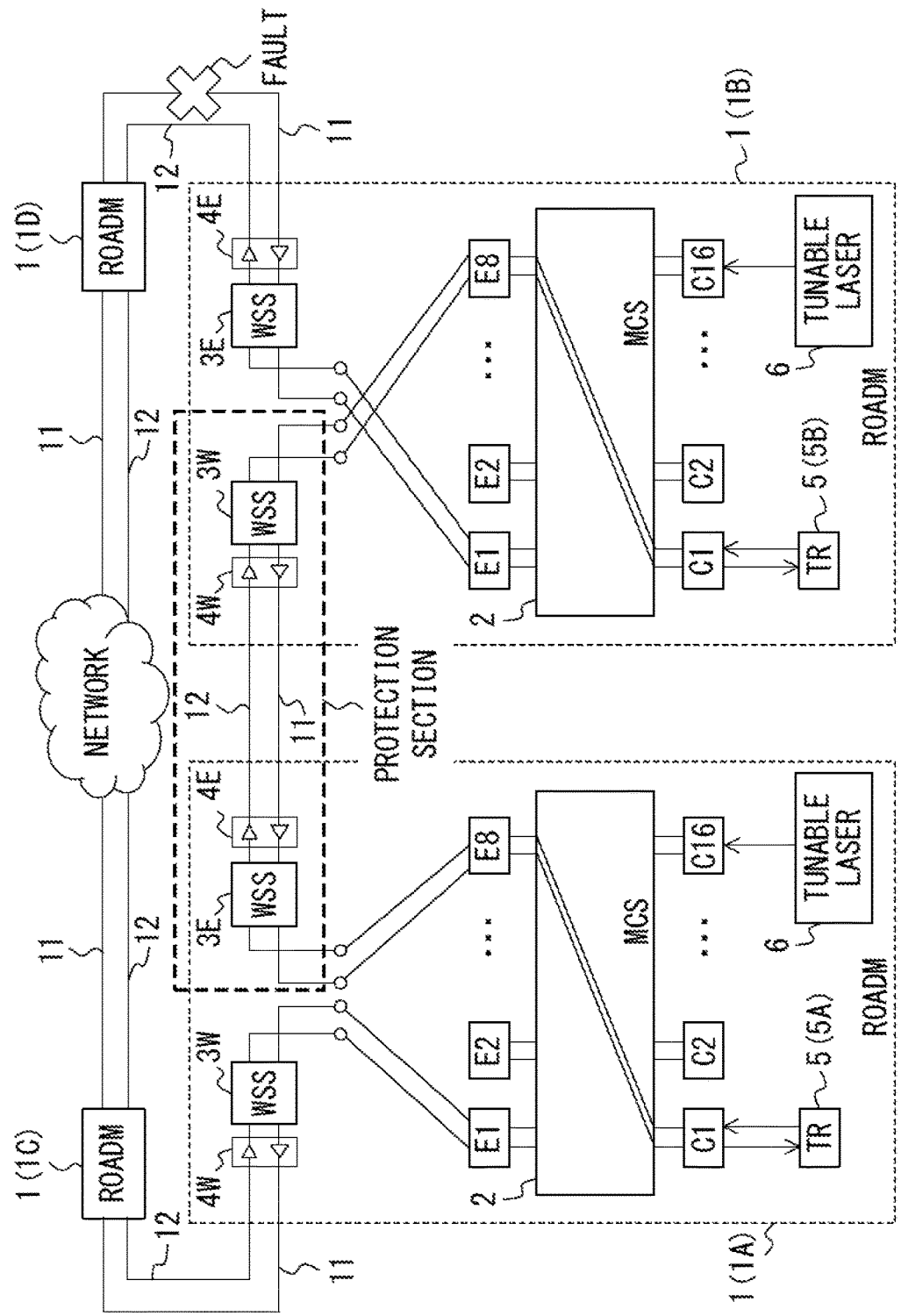
F I G. 4

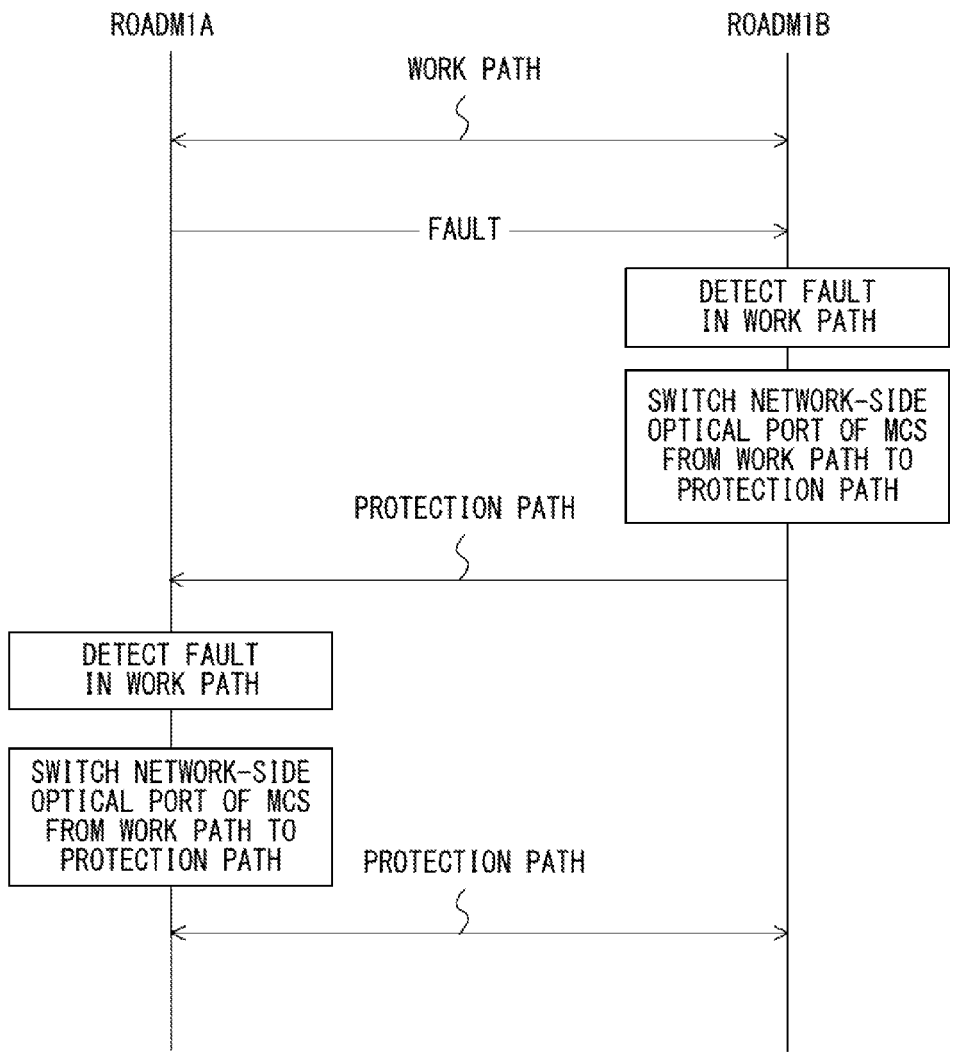
F I G. 5

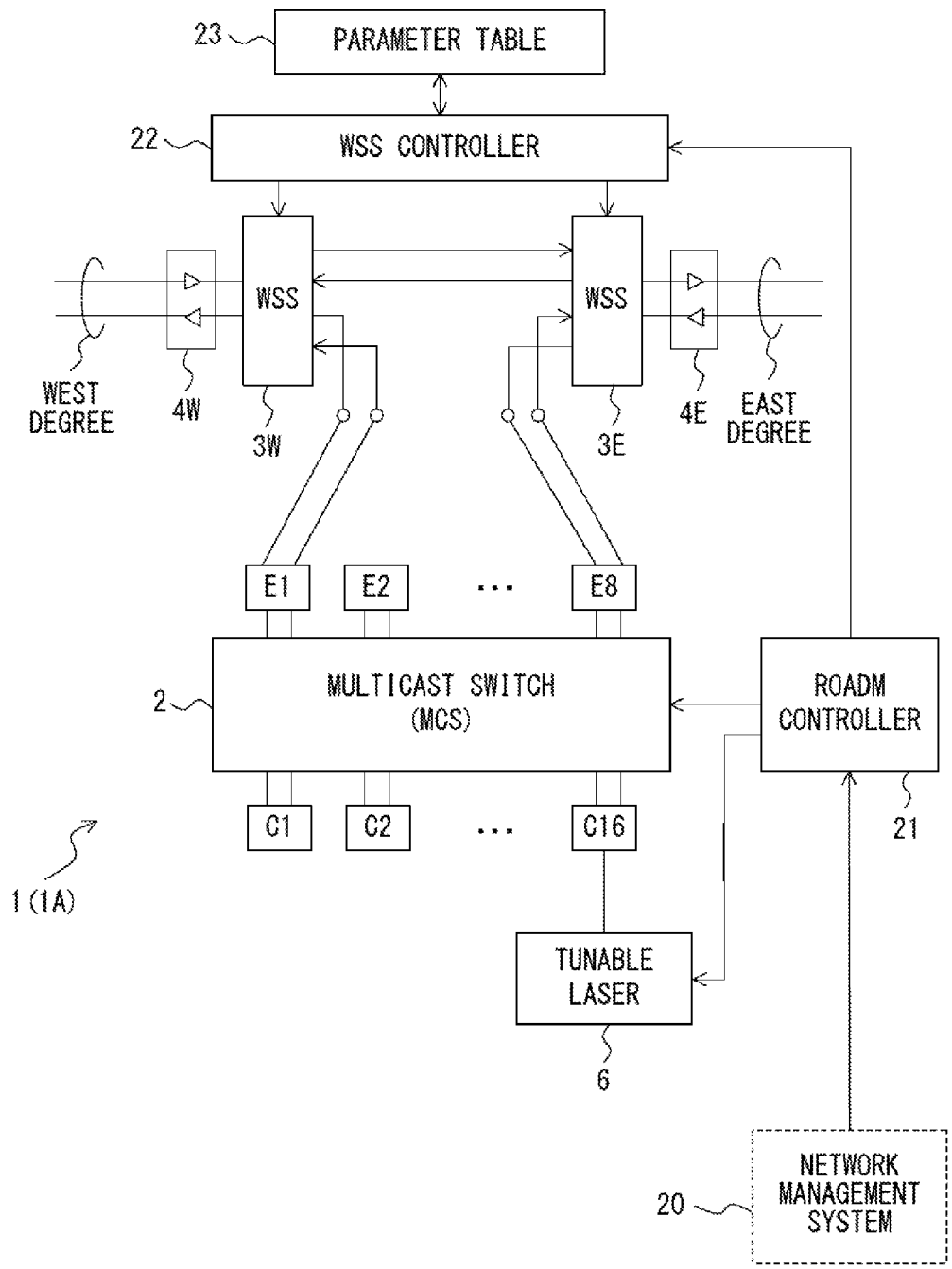
F I G. 6

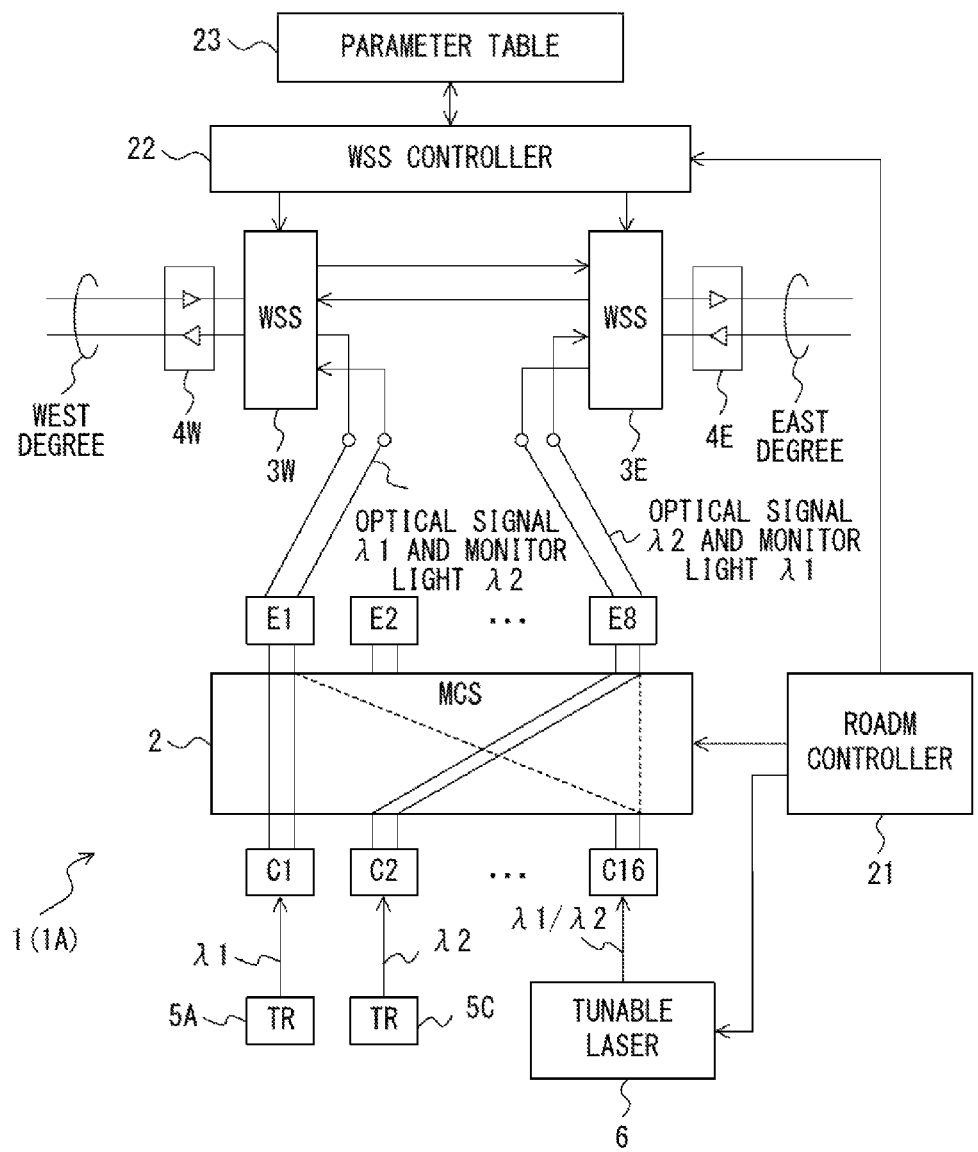
F I G. 1 3

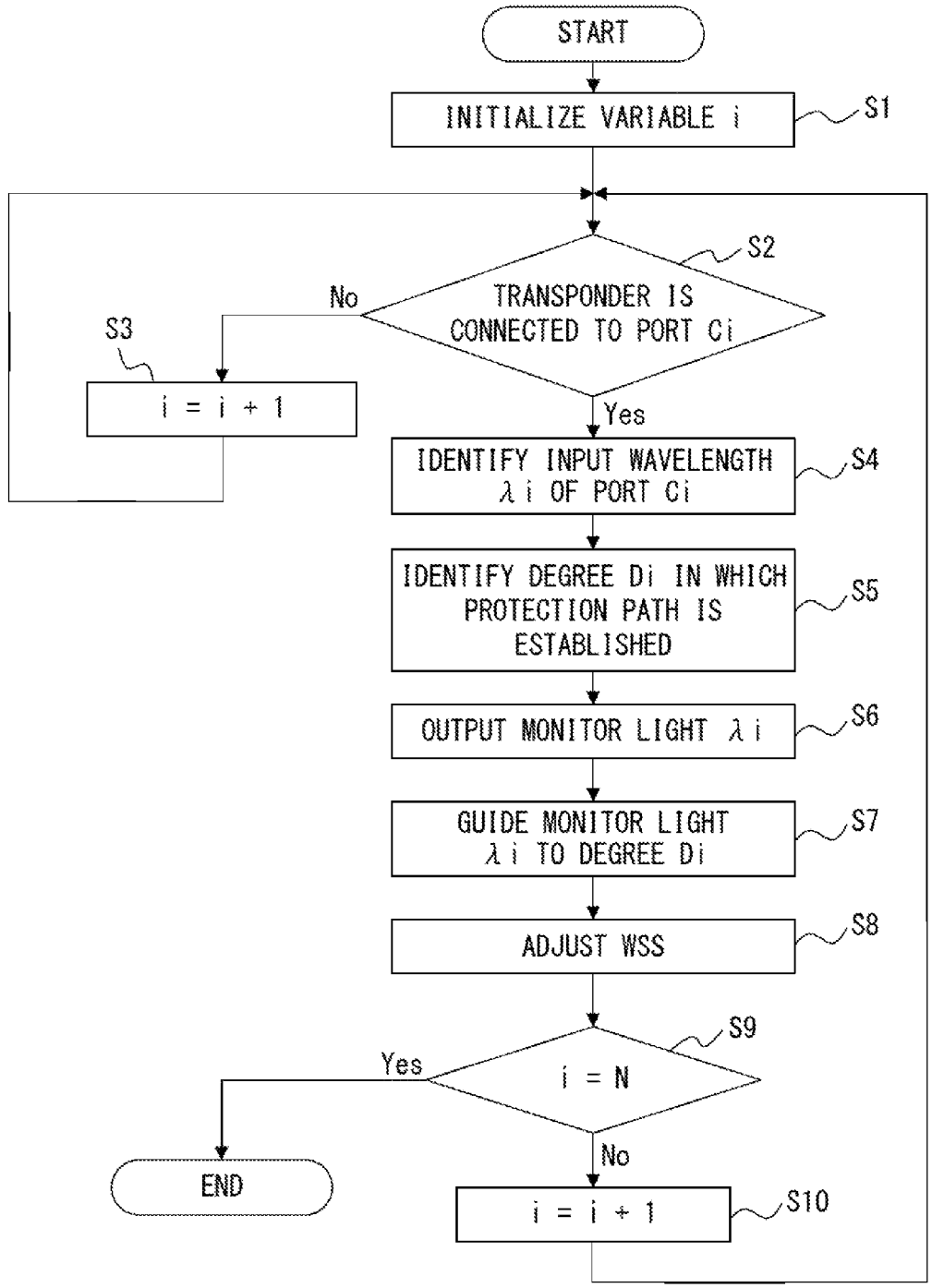
F I G. 1 4

DEVICE, SYSTEM AND METHOD FOR TRANSMITTING WAVELENGTH DIVISION MULTIPLEXED OPTICAL SIGNAL

CROSS-REFERENCE TO RELATED APPLICATION

This application is based upon and claims the benefit of priority of the prior Japanese Patent Application No. 2016-014612, filed on Jan. 28, 2016, the entire contents of which are incorporated herein by reference.

FIELD

The embodiments discussed herein are related to a transmission device, a transmission system, and a transmission method for transmitting a wavelength division multiplexed optical signal.

BACKGROUND

Wavelength Division Multiplexing (WDM) has been developed as one technique for achieving large-capacity optical communication networks. WDM can multiplex a plurality of optical signals with different wavelengths. In particular, in a WDM optical communication network, a WDM optical signal is transmitted that in which a plurality of optical signals with different wavelengths are multiplexed.

Each node in a WDM optical communication network includes, for example, a Reconfigurable Optical Add/Drop Multiplexer (ROADM) as a transmission device that processes WDM optical signals. The ROADM may drop an optical signal with a desired wavelength from a received WDM optical signal, and guide this optical signal to a client. The ROADM may add an optical signal received from a client to a WDM optical signal.

In addition, an optical communication network preferably includes a function to restore a path when a fault has occurred. A fault recovery function is achieved by, for example, a protection path.

FIG. 1 illustrates an example of fault recovery based on an OUPSR (Optical Unidirectional Path Switched Ring) function. In the example depicted in FIG. 1, a plurality of ROADMs 201 (201A-201D) form a ring network. A pair of optical fiber links connects ROADMs 201. Optical signals are transmitted bidirectionally between nodes through a pair of optical fiber links.

Assume that, in the optical communication network configured as described above, an optical signal is transmitted from a transponder 202A accommodated within the ROADM 201A to a transponder 202B accommodated within the ROADM 201B. In this case, using an optical splitter (SPL) 203, the ROADM 201A generates optical signals X1 and X2 by splitting an optical signal X transmitted from the transponder 202A. The optical signal X1 is transmitted from the ROADM 201A to the ROADM 201B through an optical transmission link 205. The optical signal X2 is transmitted from the ROADM 201A to the ROADM 201B through an optical transmission link 206. Thus, the ROADM 201B receives the optical signals X1 and X2. Then, the ROADM 201B selects one of the optical signals X1 and X2 using an optical switch 204, and guides the selected signal to the transponder 202B. Under this situation, assume that a work path has been established on the optical transmission link 205 and that a protection path has been established on the optical transmission link 206. In the example illustrated in FIG. 1, the ROADM 201B selects the optical signal X1, which has been received through the optical transmission link 205, and guides the selected optical signal X1 to the transponder 202B.

Assume that a fault occurs in the optical transmission link 205 while the communication described above is being performed. In this case, the optical signal X1 does not reach the ROADM 201B, and the ROADM 201B detects a "loss of light" or a "loss of frame" for the optical signal X1. By doing this, the ROADM 201B controls the optical switch 204 so as to guide the optical signal X2 received through the optical transmission link 206 to the transponder 202B. That is, switching from the work path to the protection path is performed to restore the path between the transponders 202A and 202B.

In this way, identical optical signals are transmitted through a work path and a protection path in the optical communication network depicted in FIG. 1. That is, while the optical communication network is being operated normally, a ROADM on a reception side receives identical optical signals through a work path and a protection path. Hence, when switching from the work path to the protection path has been performed due to detection of a fault, the path between the transponders is immediately restored.

A transmission device has been proposed that includes a work system interface unit, a protection system interface unit, and a transmission link switching unit that selects a signal supplied from the work system interface unit or the protection system interface unit (e.g., Japanese Laid-open Patent Publication No. 2001-119359). A transmission device has also been proposed that includes one protection line for a plurality of work lines (e.g., Japanese Laid-open Patent Publication No. 5-327674).

In recent years, a ROADM that includes a CDC (Colorless, Directionless, Contentionless) function (this may hereinafter be referred to as a "CDC-ROADM") has been put into practical use as one technique for achieving a flexible network. The Colorless function can allocate a desired wavelength to respective client ports of a ROADM. The Directionless function can connect a client accommodated in the ROADM to a desired degree. The Contentionless function prevents collision between optical signals with the same wavelength.

The CDC function of a ROADM may be achieved using, for example, a multicast switch. The multicast switch may guide an optical signal input via a certain optical port to one or more desired optical ports. The multicast switch may also guide a plurality of optical signals with different wavelengths input via a plurality of optical ports to one desired optical port. In this case, the plurality of optical signals with different wavelengths are combined and output.

However, when an OUPSR is configured in an optical communication network in which a CDC-ROADM is implemented at each node, there may be some problems. The following describes problems of the prior art by referring to FIG. 2.

As illustrated in FIG. 2, each CDC-ROADM 211 includes a multicast switch 212. Assume that an optical signal is transmitted from a transponder 202A accommodated in a ROADM 211A to a transponder 202B accommodated in a ROADM 211B, as in the example depicted in FIG. 1.

In this case, the ROADM 211A generates optical signals X1 and X2 by splitting an optical signal X using an optical splitter 203. The optical signals X1 and X2 are guided to different optical ports of the multicast switch 212. In the example depicted in FIG. 2, the optical signals X1 and X2 are guided to optical ports C1 and C2, respectively. The ROADM 211A controls the multicast switch 212 in a manner such that the optical signal X1 is guided to an optical transmission link 205 and such that the optical signal X2 is guided to an optical transmission link 206. As a result, the optical signal X1 is transmitted to the ROADM 211B through the optical transmission link 205, and the optical signal X2 is transmitted to the ROADM 211B through the optical transmission link 206. Meanwhile, the ROADM 211B controls the multicast switch 212 in a manner such that the optical signal X1 received through the optical transmission link 205 is guided to the optical port C1 and such that the optical signal X2 received through the optical transmission link 206 is guided to the optical port C2. The optical signals X1 and X2 respectively output from the optical ports C1 and C2 are guided to an optical switch 204. The ROADM 211B selects one of the optical signals X1 and X2 using the optical switch 204, and guides the selected optical signal to the transponder 202B. When a fault has occurred in the optical transmission link 205 for transmitting the optical signal X1, the ROADM 211B controls the optical switch 204 so as to perform switching from the work path to a protection path, as in the method depicted in FIG. 1.

In the configuration depicted in FIG. 2, however, two optical ports are used to transmit one optical signal. In particular, to transmit the optical signal X, the optical ports C1 and C2 of the multicast switch 212 are occupied in the ROADM 211A, and the optical ports C1 and C2 of the multicast switch 212 are occupied in the ROADM 211B. That is, the number of clients the ROADMs can accommodate decreases. Alternatively, the size of the multicast switch 212 needs to be increased. In addition, the switching function (multicast switch 212 and optical switch 204) in the receiving-side ROADM is arranged in two stages. In other words, the configuration of the ROADM is redundant.

Such problems may be solved in, for example, a configuration in which an optical signal is transmitted through only a work path during a normal operation (i.e., while a fault has not occurred) while an optical signal is transmitted through a protection path when a fault has occurred. However, such a configuration may extend a period of time needed to restore a path since an occurrence of a fault. For example a ROADM may include a wavelength selective switch (WSS) that processes an optical signal for each wavelength. Hence, an optical signal transmitted through a protection path corresponding to a work path in which a fault has occurred passes through one or more wavelength selective switches. A wavelength selective switch includes an optical attenuation function, and needs to adjust that attenuation function in a manner such that the power of a passing optical signal reaches a target level. However, adjusting the optical attenuation function of a wavelength selective switch takes a relatively long time (e.g., several hundred milliseconds). Therefore, in a configuration in which an optical signal starts to be transmitted through a protection path after a fault in a work path is detected, wavelength selective switches are adjusted after the fault has been detected, thereby leading to a long time to restore the path.

SUMMARY

According to an aspect of the present invention, a transmission device for which a work path is established in a first degree and a protection path corresponding to the work path is established in a second degree includes: a switch equipped with a plurality of optical ports; an optical signal generator, optically connected to a first optical port among the plurality of optical ports, and configured to generate an optical signal that is transmitted through the work path; and a monitor light generator, optically connected to a second optical port among the plurality of optical ports, and configured to generate monitor light by using a wavelength tunable light source. The monitor light generator controls a wavelength of the monitor light such that the wavelength of the monitor light is substantially the same as a wavelength of the optical signal. The switch guides the optical signal that arrives at the first optical port toward the first degree and guides the monitor light that arrives at the second optical port toward the second degree.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of fault recovery based on an OUPSR function;

FIG. 4 illustrates an example of recovery from a fault in the optical communication network depicted in FIG. 3;

FIG. 5 illustrates an exemplary sequence of switching from a work path to a protection path;

FIG. 6 illustrates an exemplary configuration of a ROADM;

FIGS. 12 and 13 illustrate a third example of a procedure for adjusting a protection path; and FIG. 14 is a flowchart illustrating an exemplary method of adjusting a protection path.

DESCRIPTION OF EMBODIMENTS

Figure 3:
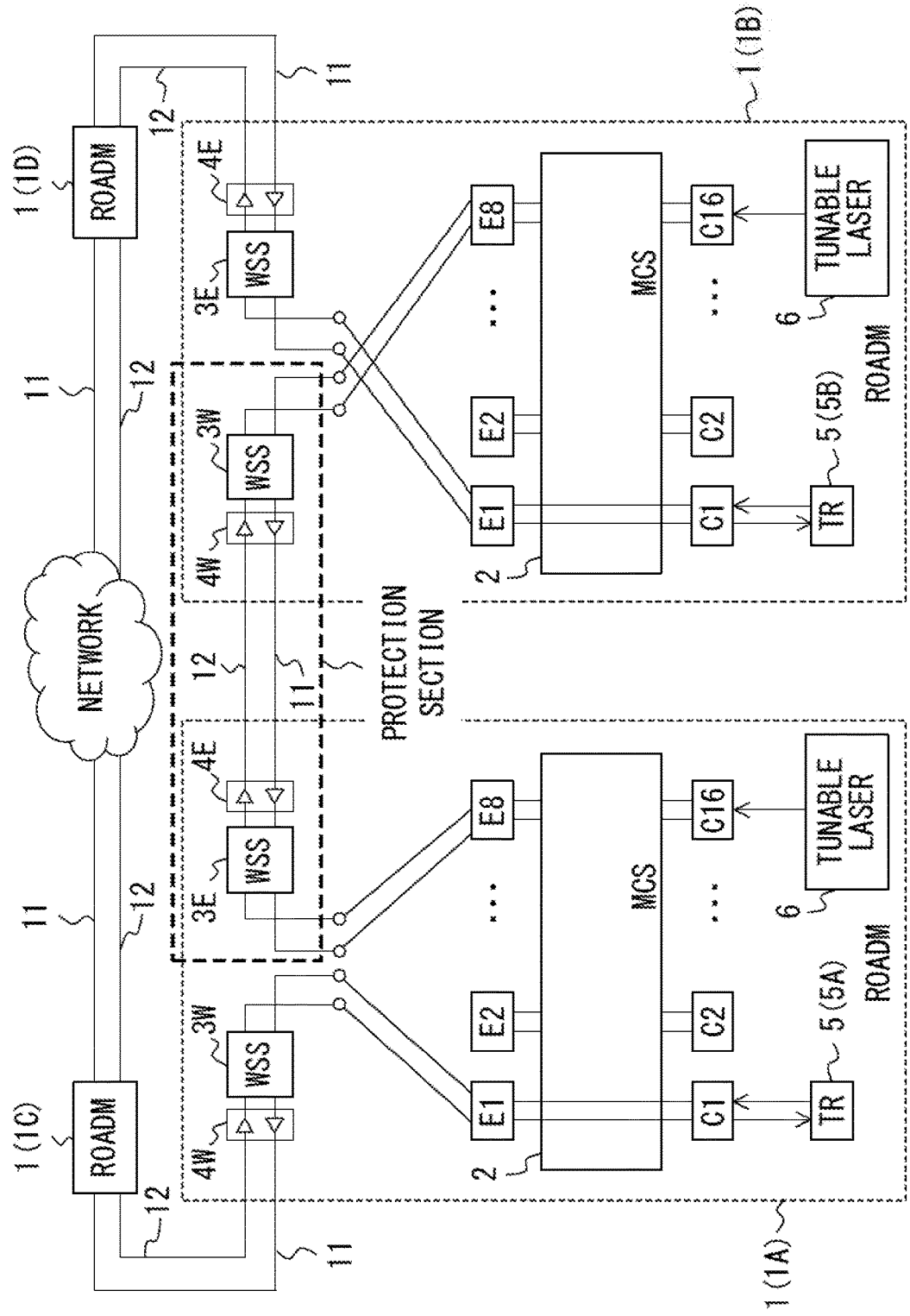
FIG. 3 illustrates an exemplary optical communication network in which a transmission device in accordance with embodiments of the present invention is used.

FIG. 3 illustrates an exemplary optical communication network in which a transmission device in accordance with embodiments of the present invention is used. In this example, the optical communication network transmits a wavelength division multiplexed (WDM) optical signal. A reconfigurable optical add/drop multiplexer (ROADM) with a CDC function is implemented in each node in the optical communication network. The ROADM can drop an optical signal with a desired wavelength from a received WDM optical signal, and guide this optical signal to a client. In addition, the ROADM can add an optical signal received from a client to a WDM optical signal.

In the example depicted in FIG. 3, a plurality of ROADMs 1 (1A-1D) form a ring network. A pair of optical fiber links connects ROADMs. Optical signals are transmitted bidirectionally through a pair of optical fiber links. An optical transmission link through which an optical signal is transmitted clockwise in FIG. 3 may hereinafter be referred to as a "transmission link 11". An optical transmission link through which an optical signal is transmitted counterclockwise in FIG. 3 may hereinafter be referred to as a "transmission link 12".

As depicted in FIG. 3, the ROADM 1 includes a multicast switch (MCS) 2, wavelength selective switches (WSSs) 3W and 3E, optical amplification circuits 4W and 4E, a transponder (TR) 5, and a tunable laser 6. Note that the ROADMs 1 implemented in respective nodes have substantially the same configuration in this example. In addition, the ROADM 1 includes further circuit element that is not illustrated in FIG. 3.

The multicast switch 2 includes a plurality of client-side optical ports C1-C16 and a plurality of network-side optical ports E1-E8. A transponder 5 may be optically connected to each of the optical ports C1-C16. In the example depicted in FIG. 3, a transponder 5A is optically connected to an optical port C1 in a ROADM 1A, and a transponder 5B is optically connected to an optical port C1 in a ROADM 1B. However, a tunable laser 6, in place of the transponder 5, is optically connected to one of the optical ports C1-C16 on an as-needed basis. In the example depicted in FIG. 3, the tunable laser 6 is optically connected to the optical port C16. However, the optical port C16 is not a dedicated port for connection of the tunable laser 6. That is, a transponder 5 may be connected to the optical port C16.

The optical ports E1-E8 are provided for corresponding degrees For example, in the ROADM 1A, the optical port E1 may be optically connected to a WEST-side degree (degree directed from the ROADM 1A to the ROADM 1C), and the optical port E8 is optically connected to an EAST-side degree (degree directed from the ROADM 1A to the ROADM 1B). In the ROADM 1B, the optical port E1 is optically connected to an EAST-side degree (degree directed from the ROADM 1B to the ROADM 1D), and the optical port E8 is optically connected to a WEST-side degree (degree directed from the ROADM 1B to the ROADM 1A).

The number of client-side optical ports is not limited to 16. The number of network-side optical ports is not limited to 8. In addition, the ROADM 1 may include a plurality of multicast switches.

Each of the wavelength selective switches 3W and 3E may split an optical signal with a desired wavelength from a WDM optical signal received from another ROADM, and guide this optical signal to the multicast switch 2. Each of the wavelength selective switches 3W and 3E may add an optical signal output from the multicast switch 2 to a WDM optical signal. The wavelength selective switch 3W may guide some of, or all of, a plurality of optical signals included in a received WDM optical signal to the wavelength selective switch 3E; the wavelength selective switch 3E may guide some of, or all of, a plurality of optical signals included in the received WDM optical signal to the wavelength selective switch 3W. Each of the optical amplification circuits 4W and 4E amplifies a WDM optical signal received from another ROADM, and amplifies a WDM optical signal to be transmitted to another ROADM.

The transponder 5 includes an optical transmitter and an optical receiver, and may be optically connected to the optical ports C1-C16. The optical transmitter generates and outputs an optical signal. The optical receiver includes, for example, a coherent optical receiver, and receives an optical signal with a designated wavelength. Note that the optical receiver may selectively receive an optical signal with a designated wavelength within the WDM optical signal.

The tunable laser 6 may generate light with an arbitrary wavelength within a signal band of a WDM optical signal.

A controller (not illustrated) controls the wavelength of output light of the tunable laser 6. For example, the wavelength of output light of the tunable laser 6 is controlled in a manner such that this wavelength becomes the same wavelength as that of an optical signal output from the transponder 5 accommodated in the multicast switch 2. The tunable laser 6 is implemented by, for example, a full-band tunable laser. It is preferable that the output optical power of the tunable laser 6 be substantially equal to the output optical power of the transponder 5. Output light from the tunable laser 6 may hereinafter be referred to as "monitor light".

Assume that an optical signal is transmitted between the transponders 5A and 5B in an optical communication network configured as described above, and that a work path and a protection path are determined for the communication between the transponders 5A and 5B in advance. In this example, a work path is established on a route that extends via ROADMs 1C and 1D. A protection path is established on a route that does not extend via the ROADMs 1C and 1D. That is, a protection path is established in a protection section depicted in FIG. 3. Before a communication starts, each wavelength selective switch provided on a route on which a work path is established is controlled to properly transmit an optical signal with a corresponding wavelength.

In this case, in the ROADM 1A, the multicast switch 2 establishes an optical path between the optical ports C1 and E1. Also in the ROADM 1B, the multicast switch 2 establishes an optical path between the optical ports C1 and E1. Accordingly, an optical signal output from the transponder 5A is transmitted to the ROADM 1B via the ROADMs 1C and 1D and guided to the transponder 5B by the multicast switch 2 of the ROADM 1B. In this situation, the optical signal is transmitted through a transmission link 11. An optical signal output from the transponder 5B is transmitted to the ROADM 1A via the ROADMs 1D and 1C and guided to the transponder 5A by the multicast switch 2 of the ROADM 1A. In this situation, the optical signal is transmitted through a transmission link 12.

Assume that a fault has occurred in the transmission link 11 between the ROADMs 1D and 1B, as depicted in FIG. 4, during the communication described above. In this case, the transponder 5B accommodated in the ROADM 1B does not receive an optical signal transmitted from the transponder 5A accommodated in the ROADM 1A. Accordingly, in the ROADM 1B, the multicast switch 2 deletes the optical path between the optical ports C1 and E1 and establishes a new optical path between the optical ports C1 and E8.

When the optical path between the optical ports C1 and E1 has been deleted in the ROADM 1B, the transponder 5A accommodated in the ROADM 1B does not receive an optical signal transmitted from the transponder 5B accommodated in the ROADM 1B. Accordingly, in the ROADM 1A, the multicast switch 2 deletes the optical path between the optical ports C1 and E1 and establishes a new optical path between the optical ports C1 and E8.

After the multicast switch 2 in each of the ROADMs 1A and 1B is controller as described above, an optical signal output from the transponder 5A is guided to the transponder 5B via the wavelength selective switch 3E of the ROADM 1A and the wavelength selective switch 3W of the ROADM 1B. That is, the optical signal output from the transponder 5A is guided to the transponder 5B via the protection section. Similarly, the optical signal output from the transponder 5B is guided to the transponder 5A via the wavelength selective switch 3W of the ROADM 1B and the wavelength selective switch 3E of the ROADM 1A. That is, the optical signal output from the transponder 5B is also guided to the transponder 5A via the protection section. As a result, switching from the work path to the protection path is completed, thereby restoring the path between the transponders 5A and 5B.

FIG. 5 illustrates an exemplary sequence of switching from a work path to a protection path. In this example, a fault occurs in a work path between the ROADMs 1A and 1B, as in the example described above.

When an optical signal transmitted from the ROADM 1A does not reach the ROADM 1B, the ROADM 1B detects a fault in the work path. When, for example, the reception power of the optical signal is less than a specified threshold level, the ROADM 1B detects a "Loss of Light (LOL)". Alternatively, when the ROADM 1B cannot recover a frame with a specified format from the received optical signal, the ROADM 1B detects a "Loss of Frame (LOF)". A "loss of frame" is detected by, for example, the transponder 5.

When the ROADM 1B detects a fault in the work path, the ROADM 1B switches the network-side optical port of the multicast switch 2 from the work path to the protection path. In the examples depicted in FIGS. 3-4, a state in which the optical ports C1 and E1 are connected is switched to a state in which the optical ports C1 and E8 are connected. The optical port E1 is connected to a degree for which the work path has been established, and the optical port E8 is connected to a degree for which the protection path has been established.

When the ROADM 1B has performed switching from the work path to the protection path, the ROADM 1A does not receive an optical signal through the work path and thus detects a fault in the work path. Accordingly, as with the ROADM 1B, the ROADM 1A also switches the network-side optical port of the multicast switch 2 from the work path to the protection path. As a result, switching from the work path to the protection path is completed between the ROADMs 1A and 1B.

As described above, when a fault in the work path is detected, switching from the work path to the protection path is performed, thereby recovering the path between the transponders. However, in the configurations depicted in FIGS. 3-4, while an optical signal is transmitted normally through a work path, no optical signals are transmitted through a corresponding protection path. Hence, in a case where a fault is detected in the work path, if the state of the protection path has not been properly adjusted, it takes a long time before high-quality optical signals can be transmitted through the protection path after the switching from the work path to the protection path. For example, to transmit high-quality optical signals through the protection path, the amount of optical attenuation of a wavelength selective switch on a route on which the protection path has been established needs to be properly adjusted. However, it may take several hundred milliseconds to adjust the amount of optical attenuation of a wavelength selective switch. Accordingly, to shorten the time for recovery from a fault, the state of a protection path is preferably properly adjusted while optical signals are transmitted through a work path.

FIG. 6 illustrates an exemplary configuration of a ROADM 1. As described above, the ROADM 1 includes a multicast switch 2, wavelength selective switches 3W and 3E, optical amplification circuits 4W and 4E, and a tunable laser 6. The ROADM 1 further includes a ROADM controller 21, a WSS controller 22, and a parameter table 23. In FIG. 6, a transponder 5 is not connected to the multicast switch 2.

The ROADM controller 21 controls the state and operation of the ROADM 1 in accordance with an instruction from a network management system 20. The network management system 20 manages the state of the optical communication network and gives instructions to each ROADM 1. For example, at a user request, the network management system 20 may give a corresponding ROADM 1 an instruction related to establishment of a work path and a protection path. This instruction includes, for example, information indicating nodes at both path ends, information indicating a route of the work path, information indicating a route of the protection path, information indicating the wavelength of the work path, and information indicating the wavelength of the protection path.

The ROADM controller 21 controls the state of the multicast switch 2. For example, the ROADM controller 21 may establish one or more optical paths between optical ports E1-E8 and optical ports C1-C16. The ROADM controller 21 also controls the wavelength of output light from the tunable laser 6. That is, the ROADM controller 21 can control the wavelength of monitor light. In addition, the ROADM controller 21 reports to the WSS controller 22 a wavelength to be selected.

The WSS controller 22 controls the states of the wavelength selective switches 3W and 3E according to a report given by the ROADM controller 21. In particular, the WSS controller 22 controls the wavelength selective switches 3W and 3E in such a manner as to pass, to shut off, or to drop an optical signal with a designated wavelength. The WSS controller 22 determines a parameter for controlling the attenuation functions of the wavelength selective switches 3W and 3E in a manner such that the powers of output optical signals from the wavelength selective switches 3W and 3E achieve a target level. The WSS controller 22 stores the determined parameter in the parameter table 23.

The ROADM controller 21 and the WSS controller 22 are implemented by a processor systems. The processor system includes a processor element that executes a given software program and a memory. Note that the ROADM controller 21 and the WSS controller 22 may be implemented by one processor system or may be implemented by respective processor systems. A hardware circuit may implement portions of the functions of the ROADM controller 21 and/or the WSS controller 22.

Figure 7:
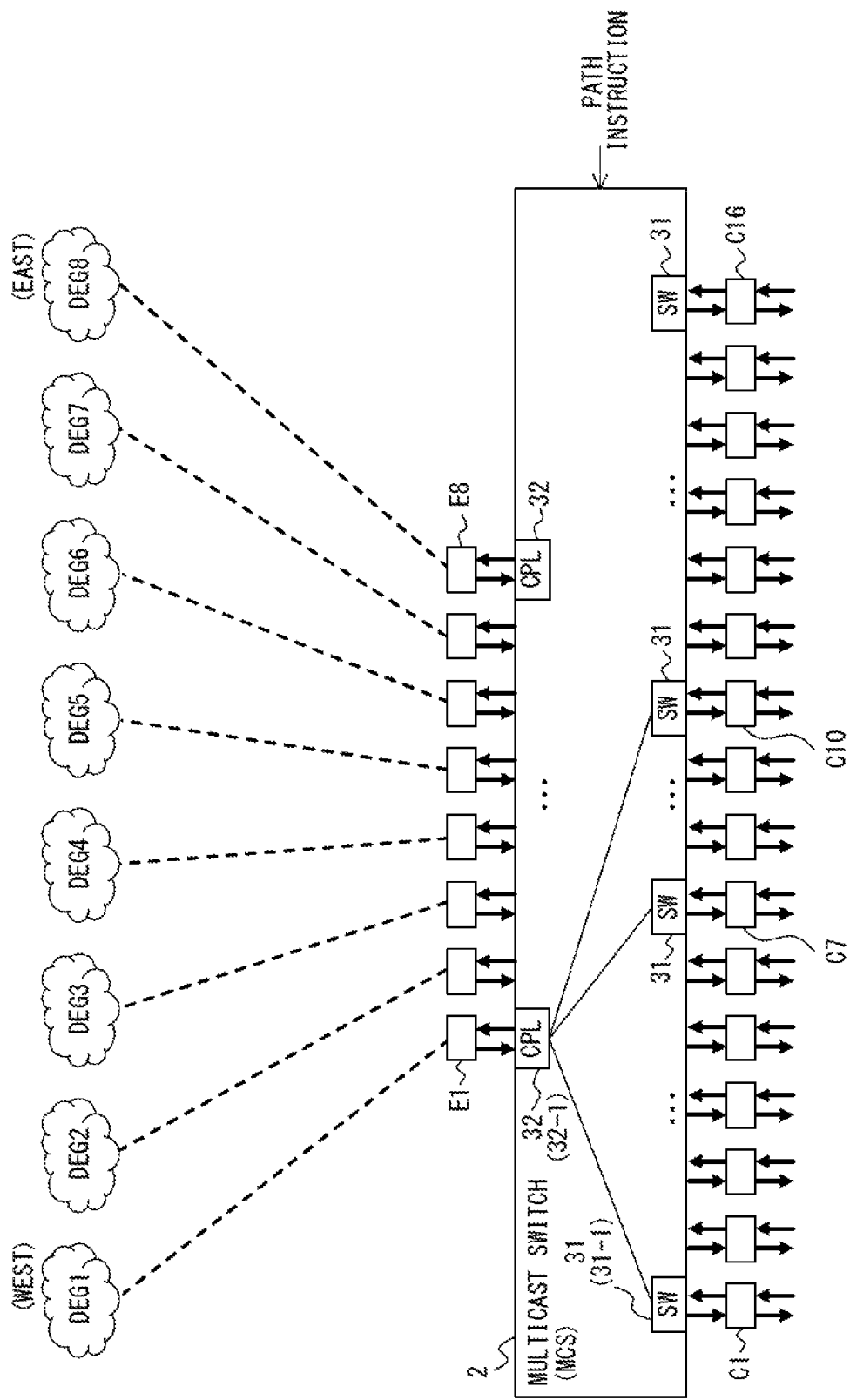
FIG. 7 illustrates an exemplary multicast switch.

FIG. 7 illustrates an exemplary multicast switch 2. The multicast switch 2 includes client-side optical ports C1-C16 and network-side optical ports E1-E8. A path instruction generated by the ROADM controller 21 is given to the multicast switch 2.

A coupler element 32 is provided for each of the optical ports E1-E8. Each coupler element 32 split an optical signal received from a corresponding degree, and guides the optical signal to the optical ports C1-C16. Each coupler element 32 also outputs optical signals from the optical ports C1-C16 to a corresponding degree. When the coupler element 32 receives a plurality of optical signals from the optical ports C1-C16, the coupler element 32 combines those optical signals. In the example depicted in FIG. 7, input optical signals λ1, λ7, and λ10 respectively from the optical ports C1, C7, and C10 are guided to the coupler element 32-1. In this case, the coupler element 32-1 combines and outputs the optical signals λ1, λ7, and λ10 to a WEST degree.

A switch element 31 is provided for each of the optical ports C1-C16. The switch element 31 selects a degree in accordance with a path instruction. When, for example, a "path instruction: connect client accommodated in optical port C1 to WEST degree" has been given to the multicast switch 2, a switch element 31-1 guides an input optical signal from the optical port C1 to the optical port E1. In this case, the switch element 31-1 selects an optical signal received from the WEST degree via the optical port E1, and guides this optical signal to the optical port C1.

Figure 8:
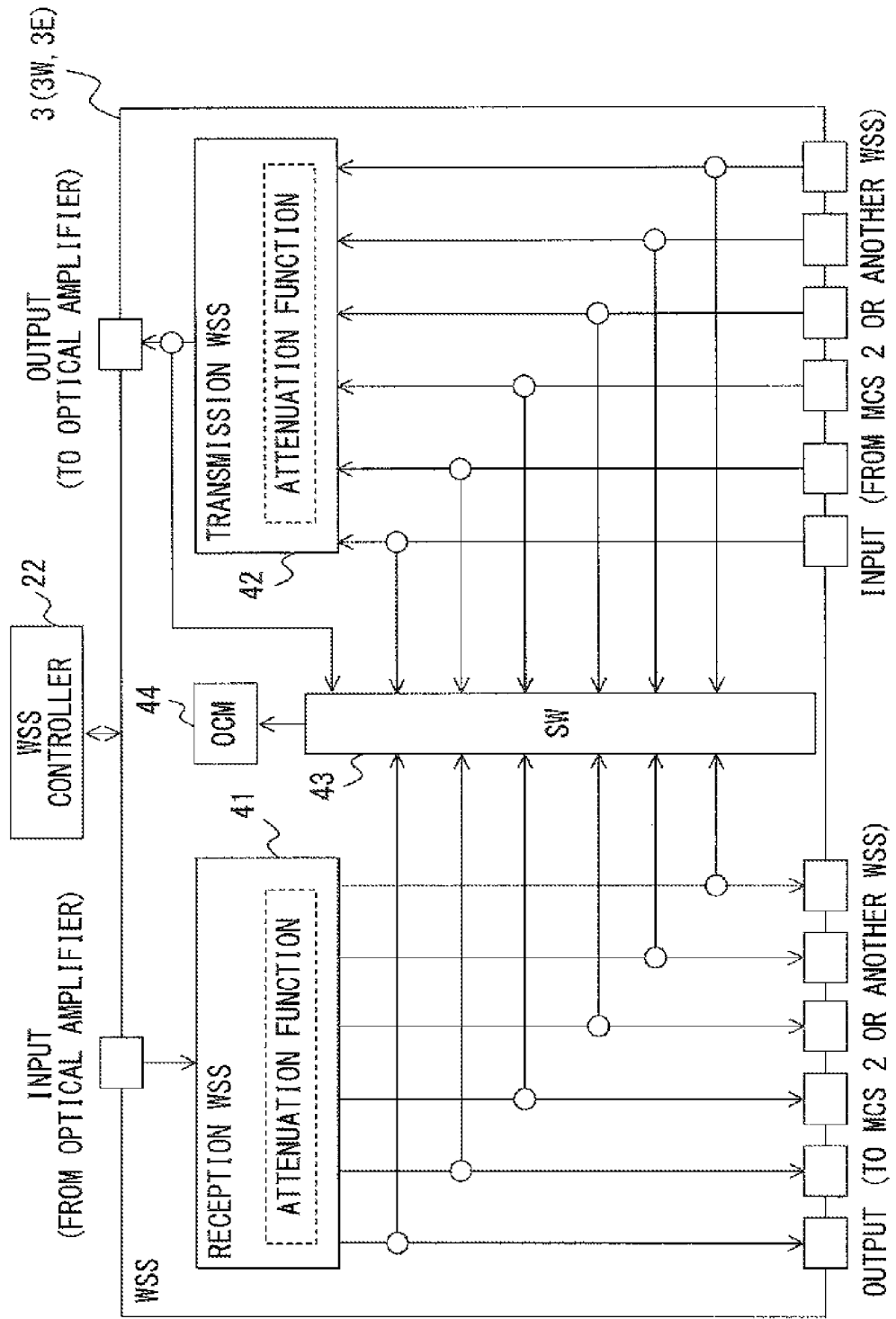
FIG. 8 illustrates an exemplary configuration of a wavelength selective switch.

FIG. 8 illustrates an exemplary configuration of a wavelength selective switch 3. As depicted in FIG. 8, the wavelength selective switch 3 includes a reception WSS 41, a transmission WSS 42, a switch 43, and an optical channel monitor (OCM) 44. The wavelength selective switch 3 depicted in FIG. 8 represents the wavelength selective switch 3W or 3E depicted in FIG. 6.

The reception WSS 41 selects, from a WDM optical signal received from a corresponding degree, optical signals with one or more wavelengths designated by a wavelength instruction, and guides the selected optical signals to the multicast switch 2 (or another degree). The transmission WSS 42 combines and outputs optical signals received from the multicast switch 2 (or another degree) to a corresponding degree. In this situation, the transmission WSS 42 may output only an optical signal with a wavelength designated by a wavelength instruction. The WSS controller 22 gives the wavelength instruction.

An output optical signal of the reception WSS 41, an input optical signal of the transmission WSS 42, and an output optical signal of the transmission WSS 42 are individually selected and guided to the optical channel monitor 44 by the switch 43. The optical channel monitor 44 monitors the power of an optical signal from the switch 43. That is, the optical channel monitor 44 may monitor the power of each optical signal selected by the reception WSS 41, and the power of an optical signal output to a corresponding degree.

The reception WSS 41 and the transmission WSS 42 each include an attenuation function for adjusting the power of an optical signal. The attenuation function can control the amount of attenuation in a manner such that the level of output optical power matches a target level for each wavelength channel. The output optical power is measured by the optical channel monitor 44 and reported to the WSS controller 22. The WSS controller 22 controls the amount of attenuation by the attenuation function in a manner such that the measured value of the output optical power approaches the target level. That is, the WSS controller 22 can control the amount of attenuation by the attenuation function in a manner such that the output optical power of the reception WSS 41 and/or the transmission WSS 42 matches the target level.

The amount of attenuation by the attenuation function is controlled by, for example, adjusting an angle of a mirror provided on an optical path between an input optical port and an output optical port. In this case, the WSS controller 22 adjusts the angle of a corresponding mirror according to the measured value of output optical power. When the measured value of output optical power has become sufficiently close to a target level, the WSS controller 22 stores a parameter (or state data) for adjustment of the angle of the corresponding mirror in the parameter table 23. The parameter is represented by, for example, a current or voltage value for driving a motor to adjust the angle of the mirror.

However, it may take several hundred milliseconds to adjust the output optical power of the reception WSS 41 and/or the transmission WSS 42 under the feedback control described above. Hence, adjusting a protection path after a fault has been detected in a work path may lead to a long time to restore the path. Accordingly, the ROADM 1 includes a function for adjusting, while an optical signal is transmitted through a work path, the attenuation function of a wavelength selective switch implemented on a protection path that corresponds to the work path.

Figure 9:
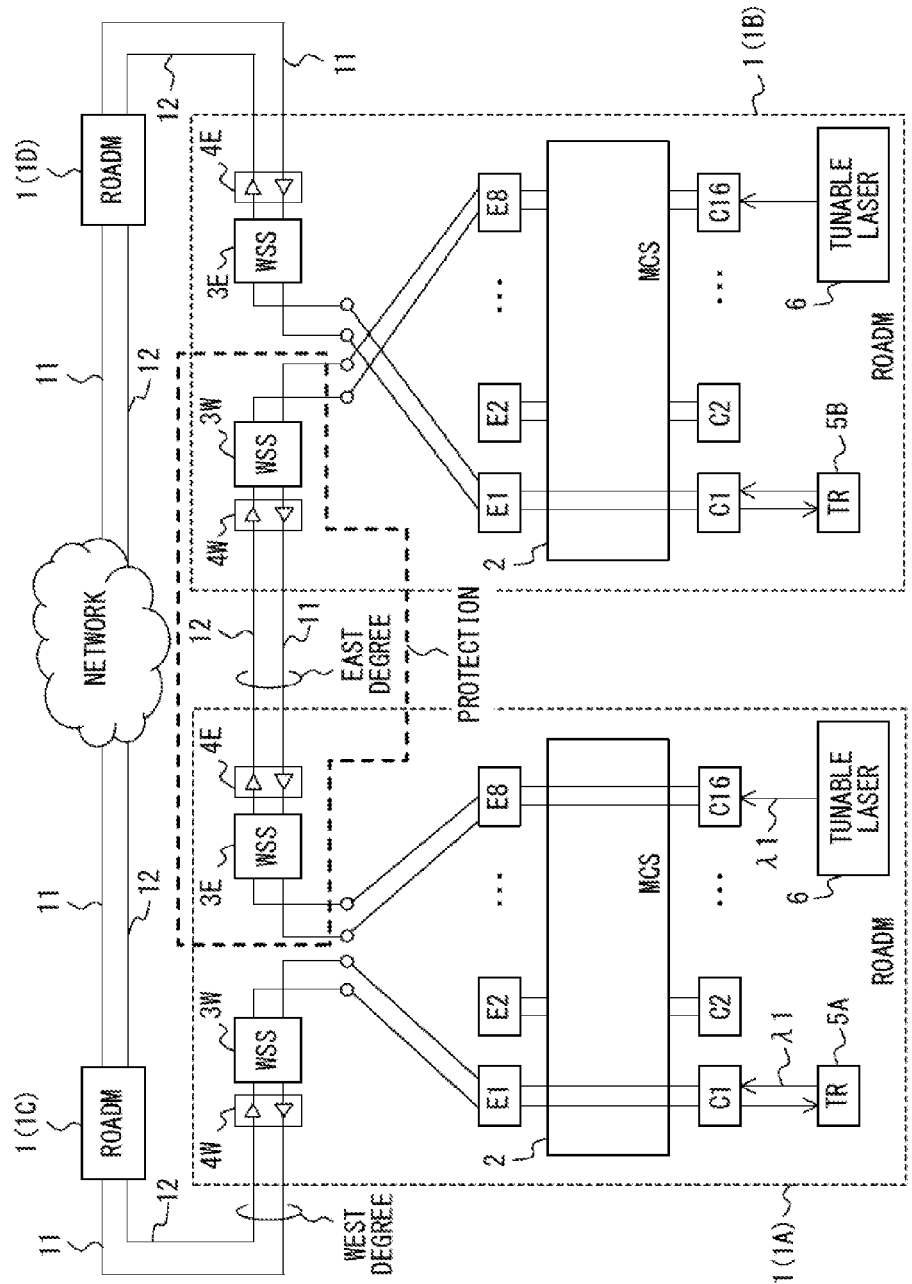
FIGS. 9 and 10 illustrate a first example of a procedure for adjusting a protection path.
Figure 10:
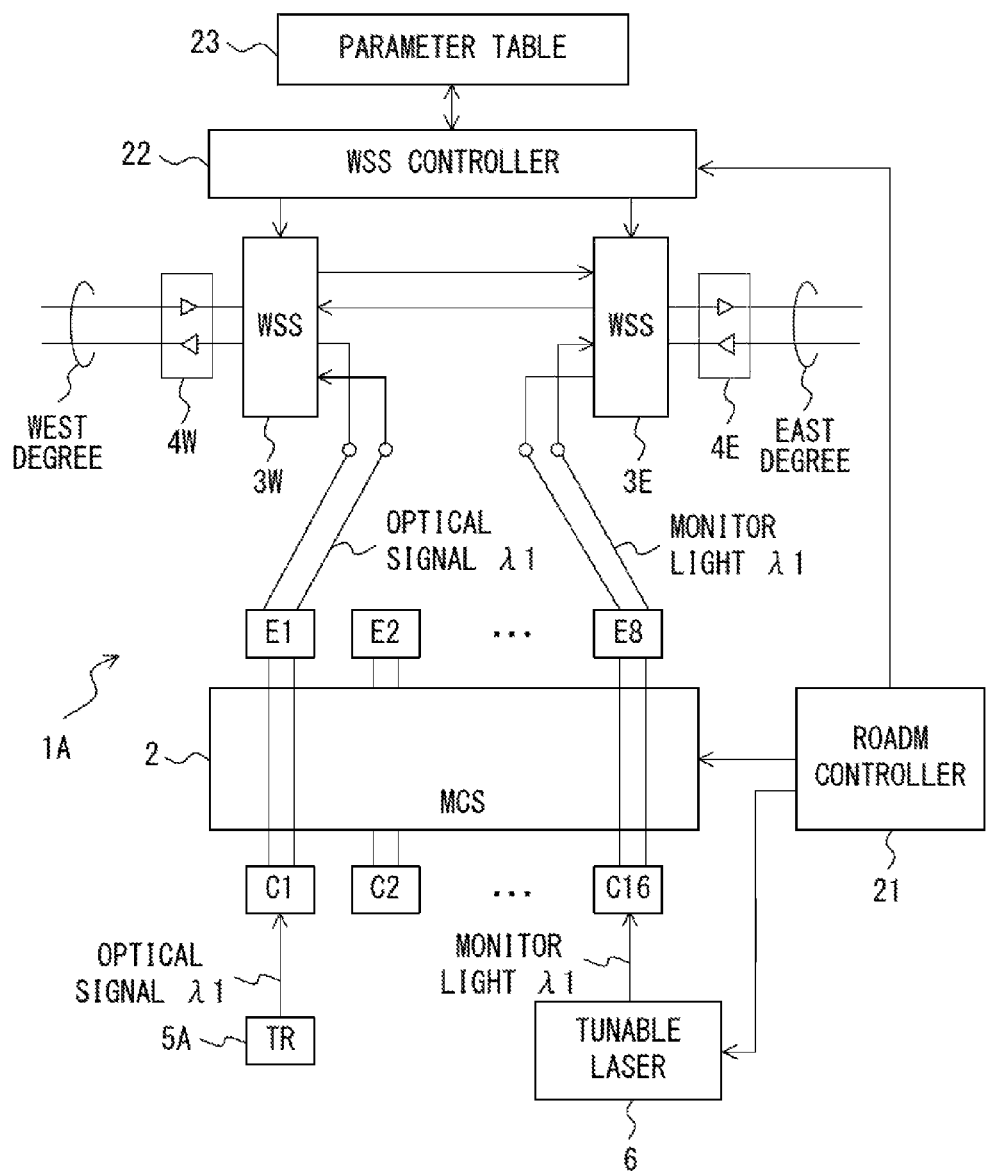

FIGS. 9 and 10 illustrate a first example of a procedure for adjusting a protection path. FIG. 9 depicts operations of the entire optical communication network. FIG. 10 depicts operations of a ROADM 1A.

In the first example, as illustrated in FIG. 9, a transponder 5A accommodated in the ROADM 1A and a transponder 5B accommodated in a ROADM 1B communicate with each other. A work path between the transponders 5A and 5B is established on a route that extends via ROADMs 1C and 1D, and a corresponding protection path is established in a protection section depicted in FIG. 9. The following descriptions, a WEST degree for the ROADM 1A corresponds to a transmission link directed from the ROADM 1A to a ROADM 1C, and an EAST degree for the ROADM 1A corresponds to a transmission link directed from the ROADM 1A to a ROADM 1B.

In the ROADM 1A, the transponder 5A is connected to the optical port C1 of the multicast switch 2. The transponder 5A transmits an optical signal with wavelength $\lambda 1$ (hereinafter referred to as optical signal $\lambda 1$). A work path between the transponders 5A and 5B is established on a route extending via the ROADMs 1C and 1D, as described above. That is, the work path is established on the WEST degree connected to the optical port E1. Accordingly, in transmitting the optical signal $\lambda 1$ through the work path, the ROADM 1A controls the multicast switch 2 so as to connect the optical ports C1 and E1. A corresponding protection path is established on the EAST degree connected to the optical port E8. Accordingly, in transmitting the optical signal $\lambda 1$ through the protection path, the ROADM 1A controls the multicast switch 2 so as to connect the optical ports C1 and E8. The work path and protection path between the transponders 5A and 5B may hereinafter be referred to as a "interested work path" and a "interested protection path", respectively.

In the ROADM 1A, the ROADM controller 21 controls the wavelength of output light from the tunable laser 6 to be $\lambda 1$. In particular, the tunable laser 6 outputs monitor light whose wavelength is the same as that of the optical signal $\lambda 1$ (hereinafter referred to as monitor light $\lambda 1$). The ROADM controller 21 also controls the multicast switch 2 in a manner such that monitor light $\lambda 1$ is transmitted through the interested protection path established in the protection section. In particular, the ROADM controller 21 connects the optical ports C16 and E8 of the multicast switch 2, as depicted in FIG. 9 or 10. As a result, the monitor light $\lambda 1$ output from the tunable laser 6 is guided to the wavelength selective switch 3E provided for the EAST degree.

In the ROADM 1A, the WSS controller 22 controls the wavelength selective switch 3E in a manner such that monitor light $\lambda 1$ is output to the EAST degree. In particular, the WSS controller 22 controls the wavelength selective switch 3E in a manner such that the transmission WSS 42 depicted in FIG. 8 outputs light with wavelength $\lambda 1$. In this situation, the WSS controller 22 controls the attenuation function of the transmission WSS 42 in a manner such that the power of the monitor light $\lambda 1$ output from the wavelength selective switch 3E approaches a target level. When the power of the monitor light $\lambda 1$ output from the wavelength selective switch 3E has become sufficiently close to the target level, the WSS controller 22 obtains a parameter representing the state of the wavelength selective switch 3E (e.g., a parameter to adjust the angle of a mirror that corresponds to wavelength $\lambda 1$) and stores the parameter in the parameter table 23.

The monitor light $\lambda 1$ output from the wavelength selective switch 3E of the ROADM 1A is transmitted to the ROADM 1B through a transmission link in the protection section. In the ROADM 1B, the monitor light λ1 is guided to the wavelength selective switch 3W. Also, in the ROADM 1B, the WSS controller 22 controls the wavelength selective switch 3W in a manner such that the monitor light λ1 is guided to the multicast switch 2. In this situation, the WSS controller 22 controls the attenuation function of the reception WSS 41 in a manner such that the power of the monitor light λ1 output from the wavelength selective switch 3W approaches a target level. When the power of the monitor light λ1 output from the wavelength selective switch 3W has become sufficiently close to the target level, the WSS controller 22 obtains a parameter representing the state of the wavelength selective switch 3W (e.g., a parameter to adjust the angle of a mirror that corresponds to wavelength λ1) and stores the parameter in the parameter table 23.

In that way, the monitor light λ1 is transmitted to the optical port E8 of the multicast switch 2 of the ROADM 1B via the optical port E8 of the multicast switch 2 of the ROADM 1A, the wavelength selective switch 3E of the ROADM 1A, the transmission link 12 between the ROADMs 1A and 1B, and the wavelength selective switch 3W of the ROADM 1B. Hence, the ROADMs 1A and 1B can confirm the connection of the protection path between the transponders 5A and 5B.

While the optical signal λ1 is being transmitted through the work path, the monitor light λ1 is transmitted through the corresponding protection path. The ROADMs 1A and 1B respectively adjust the state of wavelength selective switches implemented on the protection path using the monitor light λ1. In particular, the attenuation function of the transmission WSS 42 installed in the wavelength selective switch 3E of the ROADM 1A and that of the reception WSS 41 installed in the wavelength selective switch 3W of the ROADM 1B are adjusted. The wavelength of monitor light λ1 is the same as that of the optical signal λ1. That is, each wavelength selective switch on the protection path is adjusted to transmit the optical signal λ1 with an appropriate optical power.

After the wavelength selective switches are adjusted using monitor light and a parameter representing the state of the wavelength selective switches is stored in the parameter table 23, the wavelength selective switches do not need to keep that state. In addition, after the adjustment of each wavelength selective switch implemented on the protection path is completed, the tunable laser 6 may stop the outputting of monitor light. Alternatively, while the optical signal λ1 is transmitted through the work path, the ROADMs 1A and 1B may periodically adjust the wavelength selective switches using the monitor light λ1. When relay nodes are implemented between the ROADMs 1A and 1B, the state of wavelength selective switches of a ROADM provided for each relay node is also adjusted using the monitor light λ1.

The method of adjusting a protection path for transmitting an optical signal from the transponder 5B to the transponder 5A is substantially the same as the method of adjusting a protection path for transmitting an optical signal from the transponder 5A to the transponder 5B. However, in adjusting the protection path for transmitting an optical signal from the transponder 5B to the transponder 5A, monitor light output from the tunable laser 6 of the ROADM 1B is used to adjust the transmission WSS 42 installed in the wavelength selective switch 3W of the ROADM 1B and the reception WSS 41 installed in the wavelength selective switch 3E of the ROADM 1A.

After the adjustment of the protection path described above, when a fault has occurred in the work path as depicted in FIG. 4, the ROADMs 1A and 1B perform switching from the work path to the protection path. Switching from the work path to the protection path is achieved by, for example, the sequence depicted in FIG. 5. The parameter of each wavelength selective switch on the protection path has already been determined by the adjustment sequence described above and stored in the parameter table 23. Hence, when switching from the work path to the protection path is performed, each wavelength selective switch implemented on the protection path may be operated according to the parameter stored in the parameter table 23, thereby immediately transmitting the optical signal λ1 using a preferable optical power. Hence, it takes a short time to restore the communication between the transponders 5A and 5B.

Figure 11:
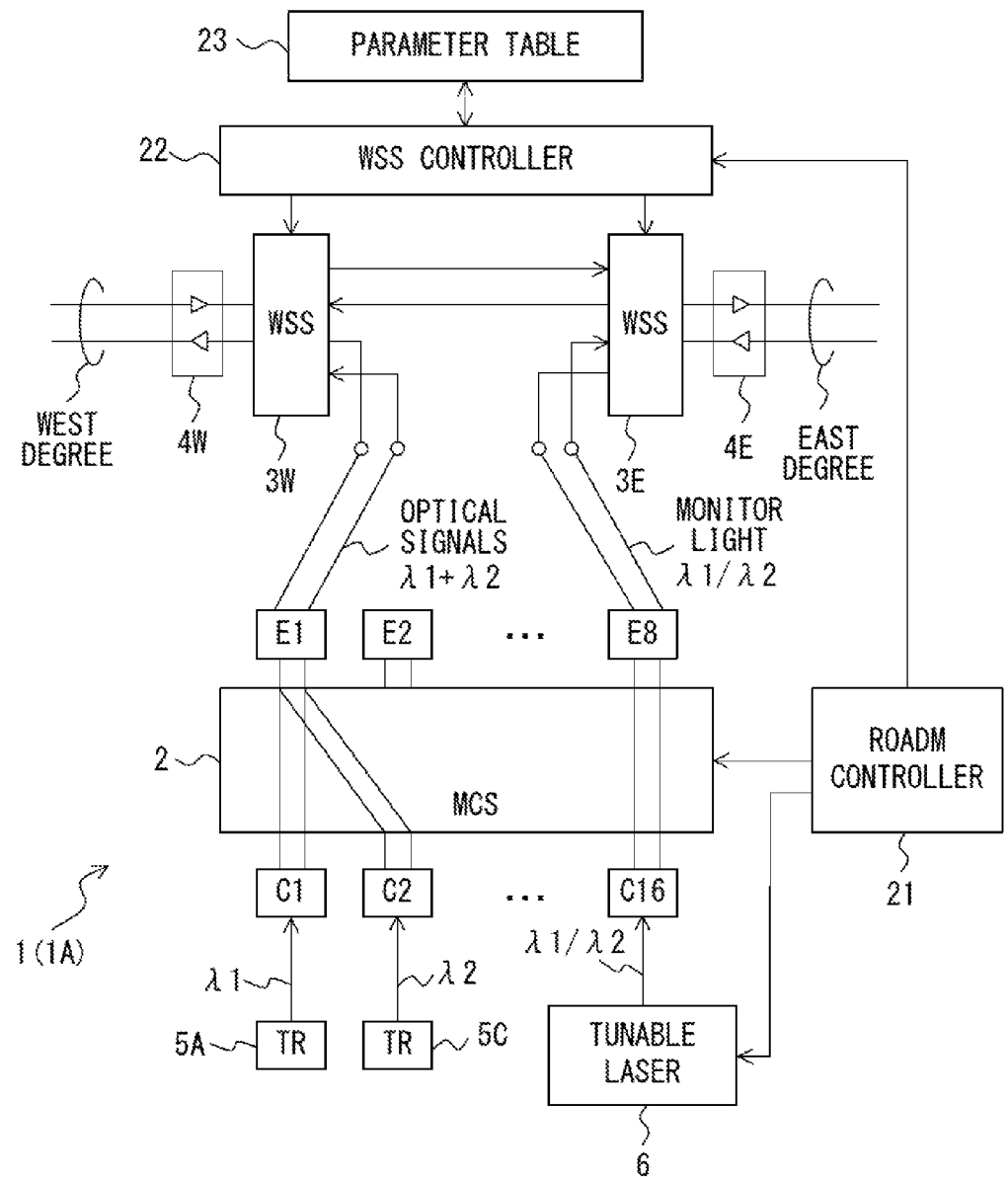
FIG. 11 illustrates a second example of a procedure for adjusting a protection path.

FIG. 11 illustrates a second example of a procedure for adjusting a protection path. In the second example, a plurality of transponders are connected to the multicast switch 2 of the ROADM 1A. In particular, in the ROADM 1A, the transponders 5A and 5C are respectively connected to the optical ports C1 and C2 of the multicast switch 2. As in the first example depicted in FIGS. 9-10, the transponder 5A transmits an optical signal with wavelength λ1 (i.e., the optical signal λ1). The transponder 5C transmits an optical signal with wavelength λ2 (hereinafter referred to as an optical signal λ2). Assume that both work paths for the optical signals λ1 and λ2 have been established on the WEST degree, and that both protection paths for the optical signals λ1 and λ2 have been established on the EAST degree.

In this case, in the ROADM 1A, the ROADM controller 21 controls the wavelength of output light from the tunable laser 6 in a manner such that that wavelength alternately becomes λ1 and λ2. That is, the tunable laser 6 alternately outputs monitor light with wavelength λ1 (hereinafter referred to as monitor light λ1) and monitor light with wavelength λ2 (hereinafter referred to as monitor light λ2). The ROADM controller 21 also controls the multicast switch 2 so as to connect the optical port C16 in which the tunable laser 6 is accommodated the optical port E8 corresponding to the EAST degree to each other.

In adjusting the protection path for the optical signal λ1, the ROADM controller 21 controls a wavelength of output light of the tunable laser 6 to be λ1. That is, the ROADM controller 21 makes the tunable laser 6 output the monitor light λ1. When the monitor light λ1 is output from the tunable laser 6, the WSS controller 22 controls the wavelength selective switch 3E in a manner such that light with wavelength λ1 is output to the EAST degree. Simultaneously, the WSS controller 22 controls the attenuation function of the transmission WSS 42 in a manner such that the power of the monitor light λ1 output from the wavelength selective switch 3E approaches a target level. When the power of the monitor light λ1 output from the wavelength selective switch 3E has become sufficiently close to the target level, the WSS controller 22 obtains a parameter representing the state of the wavelength selective switch 3E (e.g., a parameter to adjust the angle of a mirror that corresponds to wavelength λ1) and stores the parameter in the parameter table 23. As a result, the adjustment of the protection path for transmitting the optical signal λ1 is completed.

In adjusting the protection path for the optical signal λ2, the ROADM controller 21 controls a wavelength of output light of the tunable laser 6 to be λ2. That is, the ROADM controller 21 makes the tunable laser 6 output the monitor light λ2. When monitor light λ2 is output from the tunable laser 6, the WSS controller 22 controls the wavelength selective switch 3E in a manner such that light with wavelength λ2 is output to the EAST degree. Simultaneously, the WSS controller 22 controls the attenuation function of the transmission WSS 42 in a manner such that the power of the monitor light λ2 output from the wavelength selective switch 3E approaches a target level. When the power of the monitor light λ2 output from the wavelength selective switch 3E has become sufficiently close to the target level, the WSS controller 22 obtains a parameter representing the state of the wavelength selective switch 3E (e.g., a parameter to adjust the angle of a mirror that corresponds to wavelength λ2) and stores the parameter in the parameter table 23. As a result, the adjustment of the protection path for transmitting the optical signal λ2 is completed.

Adjustments of parameters for wavelength selective switches are also performed in the ROADM 1B and ROADMs implemented in each relay node. In this case, an adjustment for wavelength λ1 and an adjustment for wavelength λ2 are performed. In addition, an adjustment is also performed for a protection path for transmitting an optical signal from the ROADM 1B to the ROADM 1A.

As described above, in the second example, while optical signals λ1 and λ2 are transmitted through work paths, a protection path for the optical signal λ1 and a protection path for the optical signal λ2 are adjusted. Hence, when a fault has occurred in the transmission link for transmission of the optical signals λ1 and λ2, the communication can be immediately restored using the respective protection paths.

Figure 12:
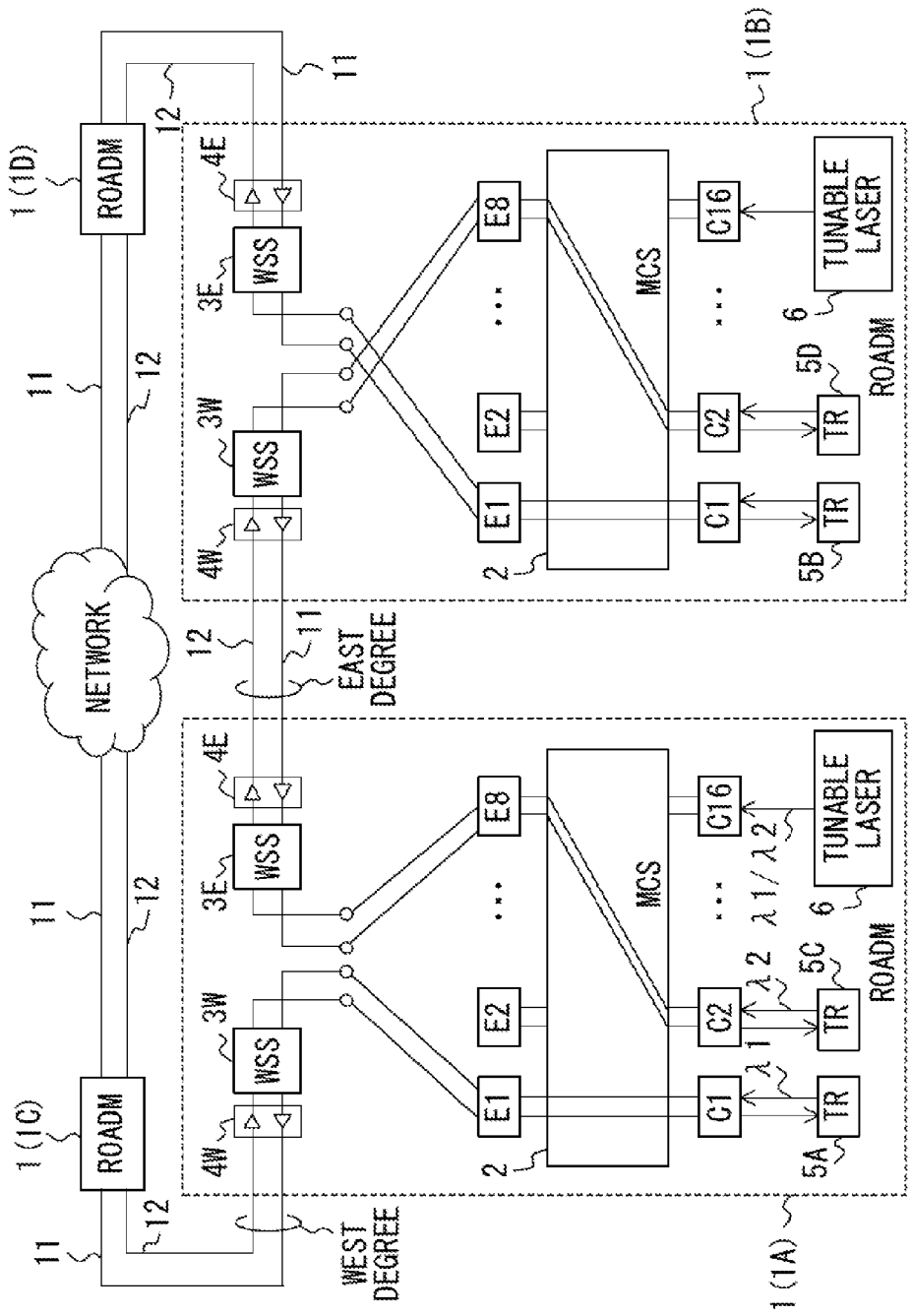

FIGS. 12 and 13 illustrate a third example of a procedure for adjusting a protection path. In the third example, the transponders 5A and 5C accommodated in the ROADM 1A respectively communicate with the transponders 5B and 5D accommodated in the ROADM 1B. However, a work path for the communication between the transponders 5A and 5B is established on a route that extends via the ROADMs 1C and 1D. Meanwhile, a work path for the communication between the transponders 5C and 5D is established on a route that does not extend via the ROADMs 1C and 1D. In the ROADM 1A, the work path and protection path for the communication between the transponders 5A and 5B are established on the WEST degree and the EAST degree, respectively. Hence, in the multicast switch 2 of the ROADM 1A, a path is established between the optical port C1 to which the transponder 5A is connected and the optical port E1 connected to the WEST degree, and a path is also established between the optical port C2 to which the transponder 5C is connected and the optical port E8 connected to the EAST degree. Similar paths are also established in the multicast switch 2 of the ROADM 1B.

As in the second example, the transponders 5A and 5C transmit optical signals λ1 and λ2, respectively. In addition, as in the second example, the tunable laser 6 alternately outputs monitor light λ1 and λ2.

In adjusting a protection path for the optical signal λ1, the ROADM controller 21 controls the wavelength of output light from the tunable laser 6 to be λ1. That is, the ROADM controller 21 makes the tunable laser 6 output the monitor light λ1. When the tunable laser 6 outputs monitor light λ1, the ROADM controller 21 connects the optical ports C16 and E8 of the multicast switch 2 in a manner such that the monitor light λ1 is output to the EAST degree. By so doing, the monitor light λ1 is guided to the wavelength selective switch 3E. The WSS controller 22 controls the wavelength selective switch 3E in a manner such that light with wavelength λ1 is output to the EAST degree. Simultaneously, the WSS controller 22 controls the attenuation function of the transmission WSS 42 in a manner such that the power of the monitor light λ1 output from the wavelength selective switch 3E approaches a target level. When the power of the monitor light λ1 output from the wavelength selective switch 3E has become sufficiently close to the target level, the WSS controller 22 obtains a parameter representing the state of the wavelength selective switch 3E (e.g., a parameter to adjust the angle of a mirror that corresponds to wavelength λ1) and stores the parameter in the parameter table 23. As a result, the adjustment of the protection path for transmitting the optical signal λ1 is completed.

In adjusting a protection path for the optical signal λ2, the ROADM controller 21 controls the wavelength of output light from the tunable laser 6 to be λ2. That is, the ROADM controller 21 makes the tunable laser 6 output the monitor light λ2. When the tunable laser 6 outputs monitor light λ2, the ROADM controller 21 connects the optical ports C16 and E1 of the multicast switch 2 in a manner such that monitor light λ2 is output to the WEST degree. By so doing, the monitor light λ2 is guided to the wavelength selective switch 3W. The WSS controller 22 controls the wavelength selective switch 3W in a manner such that light with wavelength λ2 is output to the WEST degree. Simultaneously, the WSS controller 22 controls the attenuation function of the transmission WSS 42 in a manner such that the power of the monitor light λ2 output from the wavelength selective switch 3W approaches a target level. When the power of the monitor light λ2 output from the wavelength selective switch 3W has become sufficiently close to the target level, the WSS controller 22 obtains a parameter representing the state of the wavelength selective switch 3W (e.g., a parameter to adjust the angle of a mirror that corresponds to wavelength λ2) and stores the parameter in the parameter table 23. As a result, the adjustment of the protection path for transmitting the optical signal λ2 is completed.

Adjustments of parameters for wavelength selective switches are also performed in the ROADM 1B and ROADMs implemented in each relay node. In this case, an adjustment for wavelength λ1 and an adjustment for wavelength λ2 are performed. In addition, an adjustment is also performed for a protection path for transmitting an optical signal from the ROADM 1B to the ROADM 1A.

After the adjustment of the protection paths described above, when a fault has occurred in the work path between the transponders 5A and 5C, the communication between the transponders 5A and 5C is immediately restored by the protection path adjusted using the monitor light λ1. When a fault has occurred in the work path between the transponders 5B and 5D, the communication between the transponders 5B and 5D is immediately restored by the protection path adjusted using the monitor light λ2.

FIG. 14 is a flowchart illustrating an exemplary method of adjusting a protection path. For example, the processing of this flowchart may be performed repeatedly on a specified cycle. In this example, the tunable laser 6 is optically connected to the client-side optical port C16 of the multicast switch 2, as depicted in FIG. 3 and the like.

In S1, the ROADM controller 21 initializes variable i to "1". Variable i identifies the client-side optical ports C1-C16 of the multicast switch 2.

In S2, the ROADM controller 21 decides whether a transponder 5 is connected to an optical port Ci. When a transponder 5 is not connected to the optical port Ci, variable i is incremented in S3.

When the transponder 5 is connected to the optical port Ci, the ROADM controller 21 identifies an input wavelength λi of the optical port Ci in S4. The transponder 5 connected to the optical port Ci may hereinafter be referred to as a "transponder $5i$". An optical signal transmitted from the transponder $5i$ may hereinafter be referred to as an "optical signal $\lambda i$".

In S5, the ROADM controller 21 identifies a degree Di in which a protection path for the optical signal $\lambda i$ is established. For example, path information for designating a work path and a protection path for each optical signal may be given from the network management system 20 depicted in FIG. 6 to each ROADM.

In S6, the ROADM controller 21 controls the wavelength of output light of the tunable laser 6 to be $\lambda i$. That is, the wavelength of output light of the tunable laser 6 is controlled in a manner such that the wavelength of the optical signal $\lambda i$ transmitted from the transponder $5i$ and the wavelength of output light of the tunable laser 6 is substantially identical with each other. Accordingly, the tunable laser 6 outputs monitor light $\lambda i$. In S7, the ROADM controller 21 controls the multicast switch 2 so as to guide the monitor light $\lambda i$ to the degree Di.

In S8, the WSS controller 22 controls a corresponding wavelength selective switch so as to output light with wavelength $\lambda i$ to the degree Di. In this situation, the WSS controller 22 controls the attenuation function of the wavelength selective switch in a manner such that the power of the light with wavelength $\lambda i$ output from the wavelength selective switch (i.e., monitor light $\lambda i$) approaches a target level. When the power of the monitor light $\lambda 1$ output from the wavelength selective switch has become sufficiently close to the target level, the WSS controller 22 obtains a parameter representing the state of the wavelength selective switch and stores the parameter in the parameter table 23. In other words, the WSS controller 22 determines the state of the wavelength selective switch with respect to wavelength $\lambda i$, and stores state data representing that state in a memory. In this situation, a ROADM that relays the protection path for the optical signal $\lambda i$ and a ROADM that terminates the protection path for the optical signal $\lambda i$ also adjust wavelength selective switches with respect to wavelength $\lambda i$.

In S8, in addition to adjusting the wavelength selective switch, the normality of the protection path may be checked. In this case, the transmission of the optical signal (the fact that the optical signal is transmitted to a destination through the protection path) may be checked. Moreover, a failure of the optical channel monitor 44 in the wavelength selective switch, disconnection of a connector of an optical fiber cable, and degradation of the optical fiber cable may be checked.

In S9, the ROADM controller 21 decides whether variable i has reached "N". In this example, N is 15 since the tunable laser 6 is connected to the optical port C16. In particular, a decision is made as to whether the processes of S2-S8 have been finished for all client-side optical ports to which the tunable laser 6 is not connected. When the processes of S2-S8 have not been performed for any of the client-side optical ports, the ROADM controller 21 increments variable i in S10. Then, the process of the ROADM controller 21 returns to S2. When the processes of S2-S8 have been performed for all transponders 5 connected to the multicast switch 2, the process of adjusting the protection path is completed.

As described above, the adjustment of each protection path is completed by performing the processes of the flowchart depicted in FIG. 14. For example, in the first example illustrated in FIGS. 9-10, the processes of S2-S8 are performed for the transponder 5A connected to the optical port C1. In this situation, monitor light $\lambda 1$ is output to the EAST degree, and the protection path is adjusted to transmit the optical signal $\lambda 1$ with an appropriate power. In the second example illustrated in FIG. 11, the processes of S2-S8 are performed for each of the transponders 5A and 5C connected to the optical ports C1 and C2. In this case, monitor light $\lambda 1$ and monitor light $\lambda 2$ are alternately output to the EAST degree, and the protection paths are adjusted to transmit optical signals $\lambda 1$ and $\lambda 2$ with an appropriate power. In the third example illustrated in FIGS. 12-13, the processes of S2-S8 are also performed for each of the transponders 5A and 5C connected to the optical ports C1 and C2. However, in the third example, for the transponder 5A connected to the optical port C1, the monitor light $\lambda 1$ generated in S6 is guided to the EAST degree in S7. For the transponder 5C connected to the optical port C2, the monitor light $\lambda 2$ generated in S6 is guided to the WEST degree in S7. A protection path is adjusted to transmit the optical signal $\lambda 1$ on the EAST degree with an appropriate power, and a protection path is adjusted to transmit the optical signal $\lambda 2$ on the WEST degree with an appropriate power.

Figure 2:
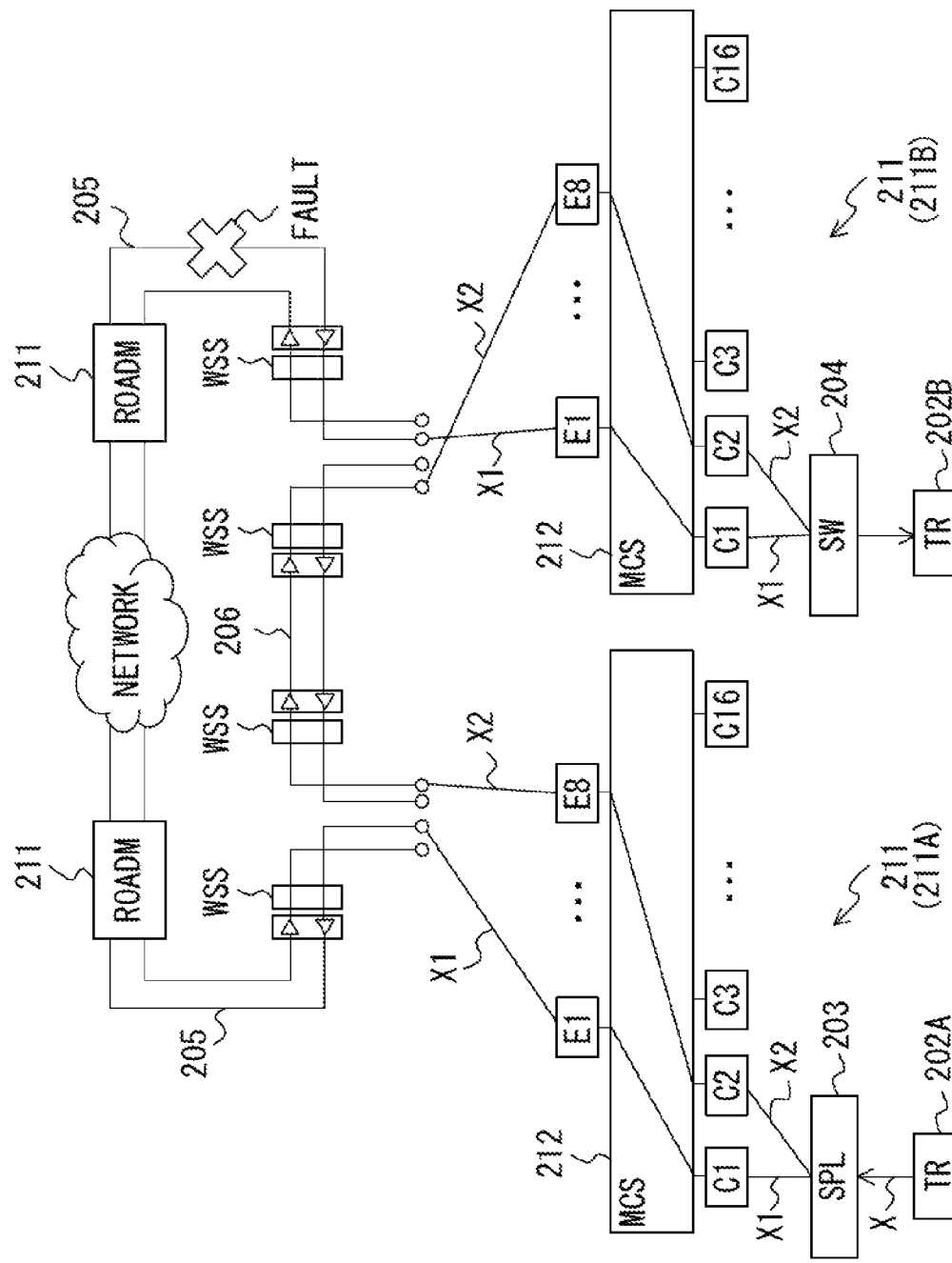
FIG. 2 illustrates problems caused when an OUPSR function is achieved in an optical communication network in which CDC-ROADMs are implemented.

As described above, according to the embodiments of the invention, in an optical communication network that includes nodes each with a CDC-ROADM implemented therein, the normality of a protection path can be checked before a fault occurs. Hence, when a fault has occurred in a work path, recovery can be achieved using the protection path in a short time. In addition, the redundancy function can be achieved by controlling multicast switches 2 provided at both path ends, thereby providing a simple ROADM configuration in comparison with a configuration in which optical switches are arranged in two stages in a reception-side ROADM (see the multicast switch 212 and the optical switch 204 in FIG. 2).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission device for which a work path is established in a first degree and a protection path corresponding to the work path is established in a second degree, the transmission device comprising:
   a switch equipped with a plurality of optical ports;
   an optical signal generator, optically connected to a first optical port among the plurality of optical ports, and configured to generate an optical signal that is transmitted through the work path; and
   a monitor light generator, optically connected to a second optical port among the plurality of optical ports, and configured to generate monitor light by using a wavelength tunable light source, wherein
   the monitor light generator controls a wavelength of the monitor light such that the wavelength of the monitor light is substantially the same as a wavelength of the optical signal, and
   the switch guides the optical signal that arrives at the first optical port toward the first degree and guides the monitor light that arrives at the second optical port toward the second degree.

2. The transmission device according to claim 1, further comprising:
a wavelength selective switch configured to select light with a designated wavelength from light guided toward the second degree; and
a controller configured to control the wavelength selective switch, wherein
the wavelength selective switch selects the monitor light guided from the switch and outputs the selected monitor light to the second degree,
the controller determines a state of the wavelength selective switch with respect to the wavelength of the monitor light in a manner such that a power of the monitor light output from the wavelength selective switch approaches a target level, and
the controller stores state data that represents the state of the wavelength selective switch in a memory.

3. The transmission device according to claim 2, wherein when a fault is detected in a route through which the optical signal is transmitted,
the switch guides the optical signal that arrives at the first optical port toward the second degree,
the controller controls the state of the wavelength selective switch according to the state data stored in the memory, and
the wavelength selective switch selects the optical signal guided from the switch and output the selected optical signal to the second degree.

4. A transmission device for which a first work path and a second work path are established in a first degree and a first protection path and a second protection path respectively corresponding to the first work path and the second work path are established in a second degree, the transmission device comprising:
a switch equipped with a plurality of optical ports;
a first optical signal generator, optically connected to a first optical port among the plurality of optical ports, and configured to generate a first optical signal with a first wavelength that is transmitted through the first work path;
a second optical signal generator, optically connected to a second optical port among the plurality of optical ports, and configured to generate a second optical signal with a second wavelength that is transmitted through the second work path;
a monitor light generator, optically connected to a third optical port among the plurality of optical ports, and configured to generate monitor light by using a wavelength tunable light source;
a wavelength selective switch configured to select light with a designated wavelength from light guided toward the second degree; and
a controller configured to control the wavelength selective switch, wherein
the switch guides the first optical signal that arrives at the first optical port and the second optical signal that arrives at the second optical port toward the first degree, and guides the monitor light that arrives at the third optical port toward the second degree,
when the monitor light generator generates monitor light with the first wavelength,
the wavelength selective switch selects the monitor light with the first wavelength guided from the switch and outputs the selected monitor light to the second degree,
the controller determines a state of the wavelength selective switch with respect to the first wavelength in a manner such that a power of the monitor light with the first wavelength output from the wavelength selective switch approaches a target level, and
the controller stores first state data that represents the state of the wavelength selective switch determined with respect to the first wavelength in a memory, and
when the monitor light generator generates monitor light with the second wavelength,
the wavelength selective switch selects the monitor light with the second wavelength guided from the switch and outputs the selected monitor light to the second degree,
the controller determines a state of the wavelength selective switch with respect to the second wavelength in a manner such that a power of the monitor light with the second wavelength output from the wavelength selective switch approaches the target level, and
the controller stores second state data that represents the state of the wavelength selective switch determined with respect to the second wavelength in the memory.

5. A transmission device that is connected to a first degree and a second degree, the transmission device comprising:
a switch equipped with a plurality of optical ports;
a first optical signal generator, optically connected to a first optical port among the plurality of optical ports, and configured to generate a first optical signal with a first wavelength that is transmitted through the first degree;
a second optical signal generator, optically connected to a second optical port among the plurality of optical ports, and configured to generate a second optical signal with a second wavelength that is transmitted through the second degree; and
a monitor light generator, optically connected to a third optical port among the plurality of optical ports, and configured to generate monitor light by using a wavelength tunable light source;
when the monitor light generator generates monitor light with the first wavelength, the switch guides the first optical signal that arrives at the first optical port toward the first degree and guides the second optical signal that arrives at the second optical port and the monitor light that arrives at the third optical port toward the second degree, and
when the monitor light generator generates monitor light with the second wavelength, the switch guides the first optical signal that arrives at the first optical port and the monitor light that arrives at the third optical port toward the first degree and guides the second optical signal that arrives at the second optical port toward the second degree.

6. The transmission device according to claim 5, further comprising:
a first wavelength selective switch, implemented for the first degree, and configured to select light with a designated wavelength from light guided toward the first degree;
a second wavelength selective switch, implemented for the first degree, and configured to select light with a designated wavelength from light guided toward the second degree; and
a controller configured to control the first wavelength selective switch and the second wavelength selective switch, wherein when the monitor light generator generates monitor light with the first wavelength,
the second wavelength selective switch selects the monitor light with the first wavelength guided from the switch and outputs the selected monitor light to the second degree,
the controller determines a state of the second wavelength selective switch with respect to the first wavelength in a manner such that a power of the monitor light with the first wavelength output from the second wavelength selective switch approaches a target level, and
the controller stores first state data that represents the state of the second wavelength selective switch determined with respect to the first wavelength in a memory, and
when the monitor light generator generates monitor light with the second wavelength,
the first wavelength selective switch selects the monitor light with the second wavelength guided from the switch and outputs the selected monitor light to the first degree,
the controller determines a state of the first wavelength selective switch with respect to the second wavelength in a manner such that a power of the monitor light with the second wavelength output from the first wavelength selective switch approaches the target level, and
the controller stores second state data that represents the state of the first wavelength selective switch determined with respect to the second wavelength in the memory.

7. A transmission method that is used by a transmission device for which a work path is established in a first degree and a protection path is established in a second degree, wherein the transmission device includes:
a switch equipped with a plurality of optical ports,
an optical signal generator, optically connected to a first optical port among the plurality of optical ports, and configured to generate an optical signal that is transmitted through the work path,
a monitor light generator, optically connected to a second optical port among the plurality of optical ports, and configured to generate monitor light by using a wavelength tunable light source,
a wavelength selective switch configured to select light with a designated wavelength from light guided toward the second degree, and
a controller configured to control the wavelength selective switch, the transmission method comprising:
controlling a wavelength of the monitor light generated by the monitor light generator such that the wavelength of the monitor light is substantially the same as a wavelength of the optical signal;
controlling the switch to guide the optical signal that arrives at the first optical port toward the first degree and guide the monitor light that arrives at the second optical port toward the second degree;
controlling the wavelength selective switch to select the monitor light guided from the switch and output the selected monitor light to the second degree;
determining a state of the wavelength selective switch with respect to the wavelength of the monitor light in a manner such that a power of the monitor light output from the wavelength selective switch approaches a target level; and
storing state data that represents the state of the wavelength selective switch in a memory.

8. A transmission system that includes a first transmission device and a second transmission device, a work path being established in a first transmission link and a protection path corresponding to the work path being established in a second transmission link between the first transmission device and the second transmission device, wherein
the first transmission device includes
a switch equipped with a plurality of optical ports,
an optical signal generator, optically connected to a first optical port among the plurality of optical ports, and configured to generate an optical signal that is transmitted through the work path,
a monitor light generator, optically connected to a second optical port among the plurality of optical ports, and configured to generate monitor light by using a wavelength tunable light source,
a wavelength selective switch configured to select light with a designated wavelength from light guided toward the second transmission link, and
a controller configured to control the wavelength selective switch, wherein
the monitor light generator controls a wavelength of the monitor light such that the wavelength of the monitor light is substantially the same as a wavelength of the optical signal,
the switch guides the optical signal that arrives at the first optical port toward the first transmission link and guides the monitor light that arrives at the second optical port toward the second transmission link,
the wavelength selective switch selects the monitor light guided toward the second transmission link and outputs the selected monitor light to the second transmission link,
the controller determines a state of the wavelength selective switch with respect to the wavelength of the monitor light in a manner such that a power of the monitor light output from the wavelength selective switch approaches a target level, and
the controller stores state data that represents the state of the wavelength selective switch in a memory.

9. The transmission system according to claim 8, wherein when the first transmission device detects a fault according to a state of an optical signal transmitted from the second transmission device to the first transmission device through the first transmission link,
the switch guides the optical signal that arrives at the first optical port toward the second transmission link,
the controller controls the state of the wavelength selective switch according to the state data stored in the memory, and
the wavelength selective switch selects the optical signal guided from the switch and output the selected optical signal to the second transmission link.

* * * * *